(12) United States Patent
Ogura et al.

(10) Patent No.: US 6,417,508 B1
(45) Date of Patent: Jul. 9, 2002

(54) IMAGE READING APPARATUS USING LIGHT GUIDE WHICH GUIDES LIGHT INCIDENT THEREON IN A LONGITUDINAL DIRECTION TO BE EMITTED FROM SIDES OF LIGHT GUIDE PARALLEL WITH LONGITUDINAL DIRECTION

(75) Inventors: Makoto Ogura, Isehara; Akihiko Yushiya, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 09/716,282

(22) Filed: Nov. 21, 2000

Related U.S. Application Data

(62) Division of application No. 08/897,511, filed on Jul. 21, 1997, now Pat. No. 6,172,356.

(30) Foreign Application Priority Data

Jul. 26, 1996 (JP) ............................................... 8-197645
Jun. 27, 1997 (JP) ............................................... 9-171930

(51) Int. Cl.[7] ............................................... G02B 5/172

(52) U.S. Cl. .................................... 250/227.2; 358/293

(58) Field of Search ......................... 250/227.11, 227.2; 358/293, 294; 385/31, 39, 47

(56) References Cited

U.S. PATENT DOCUMENTS

| | | | |
|---|---|---|---|
| 3,898,585 A | 8/1975 | Hedrich et al. | 331/94.5 |
| 4,576,436 A | 3/1986 | Daniel | 350/96.1 |
| 4,618,212 A | 10/1986 | Ludington et al. | 350/96.21 |
| 4,986,624 A | 1/1991 | Sorin et al. | 350/96.19 |
| 5,349,602 A | 9/1994 | Mehuys et al. | 372/98 |
| 5,390,085 A | 2/1995 | Mari-Roca et al. | 362/31 |
| 5,546,888 A | 8/1996 | Skiver et al. | 116/286 |
| 5,630,004 A | 5/1997 | Deacon et al. | 385/129 |
| 5,771,321 A | 6/1998 | Stern | 385/31 |
| 5,966,493 A | 10/1999 | Wagoner et al. | 385/140 |
| 6,015,200 A | 1/2000 | Ogura | 347/3 |

Primary Examiner—Stephone B. Allen
(74) Attorney, Agent, or Firm—Fitzpatrick, Cella, Harper & Scinto

(57) ABSTRACT

A sensor unit and LEDs are arranged on a sensor board. A light guide is placed above the resultant structure with be parallel to the sensor. The two end portions of the light guide are bent downward at right angles, and the bent end portions serve as incident portions on which light beams from the LEDs are incident. Light entering the light guide emerges from an exit portion to be irradiated on an original. The light reflected by the original is read by the sensor. The direction in which the reflected light is incident on the sensor is parallel with the direction in which the light from each LED is incident on the incident portion. With this structure, in the image sensor, electrical connection between the LEDs, the sensor unit, and an external system is facilitated.

17 Claims, 22 Drawing Sheets

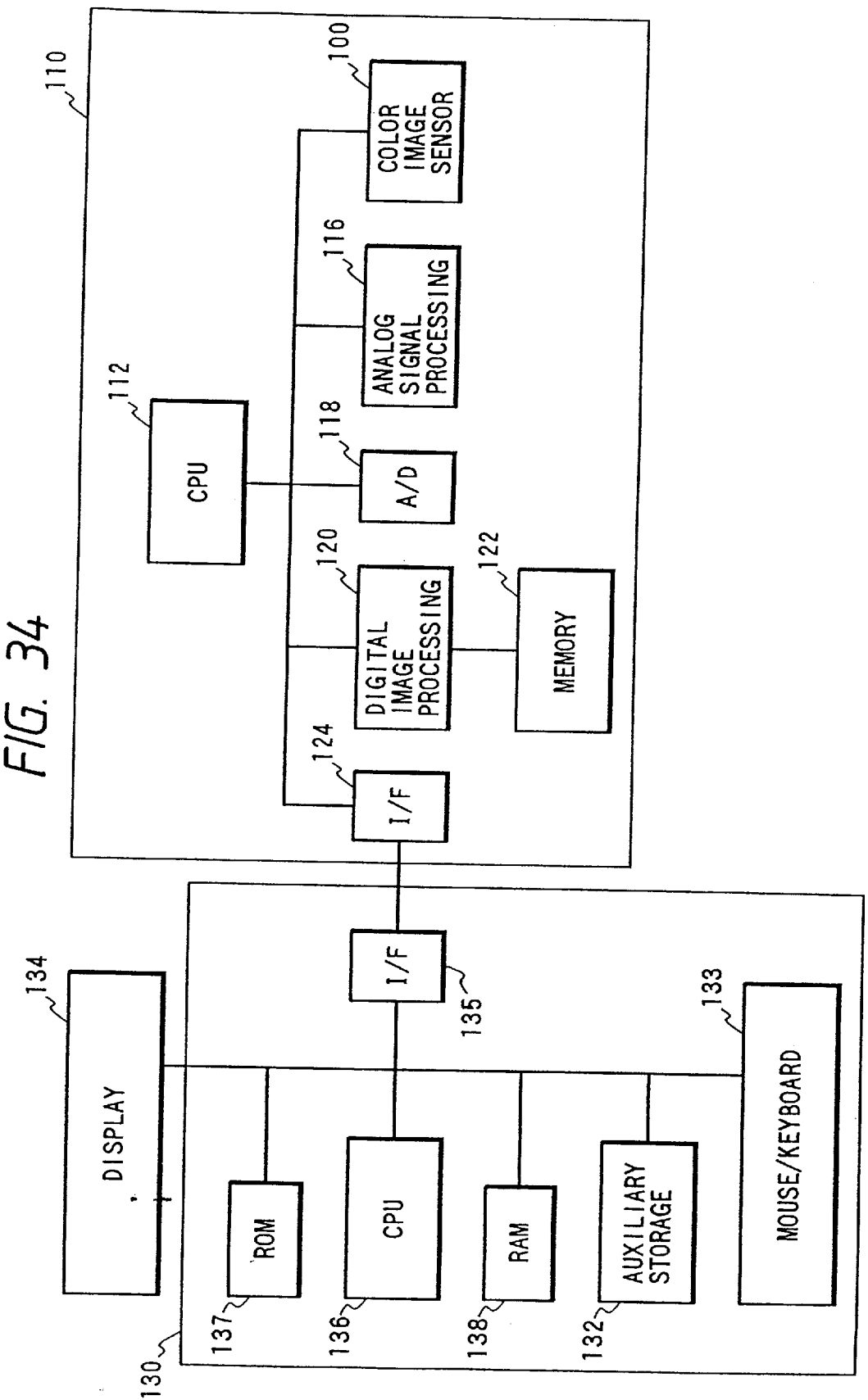

IMAGE READING APPARATUS USING LIGHT GUIDE WHICH GUIDES LIGHT INCIDENT THEREON IN A LONGITUDINAL DIRECTION TO BE EMITTED FROM SIDES OF LIGHT GUIDE PARALLEL WITH LONGITUDINAL DIRECTION

This is a divisional application of application Ser. No. 08/897,511, filed Jul. 21, 1997 now U.S. Pat. No. 6,172,356.

BACKGROUND OF THE INVENTION

1. Field of the Invention

The present invention relates to an image reading apparatus suitably used as an image sensor in a scanner, a copying machine, or the like.

2. Related Background Art

FIGS. 26 to 28 show an image sensor according to a related art. As shown in FIGS. 26 to 28, this sensor is constituted by a sensor unit 1, a sensor board 2 on which the sensor unit 1 is mounted, a lens array 3, an illumination device 4, a transparent glass plate 5, and a frame 6 for positioning/holding these components. The illumination device 4 includes lead frame type LEDs 7 and a light guide 8. An output from the sensor unit 1 is supplied to an external system through a connector 13 mounted on the sensor board 2. Note that halogen or xenon lamps or the like may be used as light sources in place of the LEDs.

The LEDs 7 are electrically connected to the external system through connector cables 16 constituted by lead portions 11 and LED connectors 12. As shown in FIG. 27, since the two LEDs 7 are arranged on both sides of the light guide 8, two connector cables 16 are required. In addition, since the LEDs 7 emit light onto the two ends of the light guide 8, the overall image sensor tends to increase in size in the longitudinal direction.

As shown in FIG. 28, light L emitted from the LED 7 is incident on an incident surface 8a of the light guide 8. The light having reached a diffusion portion 8d emerges from the light guide 8 through an exit surface 8c (FIG. 26). The light that is incident at an incident angle θ of 49° or less (when the light guide is made of an acrylic resin and has a refractive index n=1.5) satisfies the total reflection angle, condition and propagates in a desired direction.

When an original (not shown) is placed on the glass plate 5, the light emerging from the exit surface 8c passes through the glass plate 5 and is reflected by the original. The reflected light then reaches the sensor unit 1 through the lens array 3. The sensor unit 1 is a line sensor constituted by many photoelectric conversion elements arranged in a line, and serves to read an original image while scanning it. The read image signal is sent to the external system through the connector 13 and a lead wire.

A color image sensor according to the related art will be described next.

A light source switching type color image sensor has been known. This sensor includes LEDs respectively having the properties of emitting light beams of three colors, i.e., R, G, and B light beams. The sensor emits R, G, and B light beams at the same position on an original, and outputs signals by reading the reflected light beams. A color image signal corresponding to the original is then obtained in accordance with the output signals. FIGS. 29 to 33 show an example of the light source switching type color image sensor. This image sensor includes an LED array constituted by R, G, and B LEDs arranged in a line, a short-focus imaging element lens array, and a sensor array constituted by a plurality of line sensors arranged in a line.

Referring to FIGS. 29 and 30, a transparent glass plate 201 on which an original is to be placed is mounted on the upper portion of a frame 200. Light beams emitted form R, G, and B LEDs 230R1, 230G1, 230B1, 230R2, 230G2, 230B2, . . . , which are alternately arranged in a line on an LED board 210 mounted in the frame 200 as shown in FIG. 31, are reflected by the original placed on the upper surface of the glass plate 201. Reflected light beams 213 are read by a sensor array 10 on a board 19 through an optical system 209. As the optical system 209, the above short-focus image element lens array represented by, e.g., "SELFOC lens array" (available from Nippon Sheet Glass Co., Ltd.) is used.

As shown in FIG. 31, the LEDs 230R1, 230G1, 230B1, 230R2, 230G2, 230B2, . . . are mounted on the LED board 210. FIG. 32 shows the structure of each of these LEDs, and more specifically, the LED 230R1 as an example. An LED chip 211R1 is mounted on an LED base 216. The emission surface side of the LED chip 211R1 is covered with a transparent resin 215. On the LED board 210, these LEDs 230R1, 230G1, 230B1, 230R2, 230G2, 230B2, . . . can be ON/OFF-controlled at independent timings respectively set for R, G, and B.

As shown in FIG. 33, the sensor array 10 is constituted by a plurality of line sensors $10_1$, $10_2$, $10_3$, . . . arranged in a line on the board 19, and a protective film 206 covering the line sensors. In principle, the contact multichip image sensor is designed to form reflected light from an original into a one-to-one image on the sensor array 10 and read it. For this reason, the sensor array 10 needs to have a length equal to the width of an original to be read. Therefore, as the size of an original to be read changes, the required length of the sensor array 10 changes, and the number of line sensors constituting the sensor array 10 changes. Assume that an A3-size original is to be read. In this case, if one line sensor is 20 mm long, it suffices if the sensor array 10 is constituted by 15 line sensors $10_1$ to $10_{15}$.

The board 19 is supported by a bottom plate 205 engaged with the frame 200 as shown in FIG. 30, and connected to a flexible board 203 through a flexible interconnection 208 as shown in FIG. 33. A connector 202 for power, control signals, and the like is mounted on the flexible board 203. The flexible board 203 is fastened to the frame 200 with screws 207.

A color original read operation of the color image sensor having the above arrangement is started from loading of data for correction shading caused by variations in sensitivity of the respective line sensors or irregularities in light irradiated from the light sources. The shading correction data is loaded as follows. Light beams are sequentially emitted from the R LEDs 230R1, 230R2, . . . , the G LEDs 230G1, 230G2, . . . , and the B LEDs 230B1, 230B2, . . . in units of colors to read a white reference set in the image sensor. The resultant output signals from the image sensor are temporarily stored in a memory. Shading correction is performed by using the obtained R, G, and B shading correction signals obtained in such a manner that when the white reference is read again, the R, G, and B signals are uniform on one line, and an output signal r obtained when the R LEDs 211R1, 211R2, . . . are turned on, an output signal g obtained when the G LEDs 211G1, 211G2, . . . are turned on, and an output signal b obtained when the B LEDs 211B1, 211B2, . . . are turned on are set to r=g=b.

In an actual original read operation of the light source switching type color image sensor, to obtain R, G, and B signals at one point on the original to be read, R, G, and B light beams must be separately irradiated on the original. In this case, the operation of subscanning the image sensor over the entire original with one of the R, G, and B LEDs being turned on may be repeated three times while the type of LED turned on is changed. That is, the original may be read by the so-called field sequential scheme. Alternatively, the image sensor may be subscanned over the entire original while the R, G, and B LEDs are sequentially turned on in units of lines to be read, thereby obtaining R, G, and B signals. That is, the original may be read by the so-called line sequential scheme. By either of these methods, R, G, and B signals can be obtained from the entire original surface, and a color image can be reproduced by using the signals.

In the apparatus described with reference to FIGS. 26 to 28, however, the LEDs 7 are electrically connected to the external system through the connector cables 16, and the main irradiation direction of the LEDs 7 coincides with the longitudinal direction of the light guide 8. For this reason, the following problems are posed.

(1) Since the connector cables 16 equal in number to the LEDs 7 are required, the cost of the connector cables 16 and the number of steps of mounting them to the leads of the LEDs 7 increase, resulting in an increase in cost.

(2) The connector for inputting/outputting electrical signals between the image sensor and the external system and the connector for the light sources must be separately required. As a result, electrical connection to the external system becomes complicated, and the structure becomes susceptible to noise.

(3) Since no luminance adjustment circuits for the LEDs 7 can be arranged between the LEDs 7 and the external system, the illuminance on an original line to be read cannot be made uniform. For this reason, variations in sensor outputs (bright sensor outputs) obtained when image sensors read a white original become large among the image sensors.

(4) If a color image sensor for reading a color original by switching light sources for three colors (R, G, and B) is to be obtained by using the above arrangement shown in FIGS. 26 to 28, at least four lead portions 11 are required. Problems (1) to (3) described above become more serious.

(5) The structure including the portions required to hold the LEDs 7 on the two ends of the light guide 8 and to perform a process for the connector cables 16 becomes complicated, and the size in the longitudinal direction increases.

An LED array has many advantages over a tubular light source which has often used in the related art to illuminate a color original to read it. For example, the LED array is compact and has good response characteristics. Owing to these advantages, the LED array is expected as a color light source of the next generation. However, the following problems are posed in the light source switching type color image sensor using the R, G, and B LEDs described with reference to FIGS. 29 to 33.

(6) Since the types of LED chips are limited, the degree of freedom of illumination light is low. For this reason, optimal illumination light for a color original read operation cannot always be obtained.

(7) The spectral characteristics of the LED are greatly affected by changes in temperature, e.g., an increase in the temperature of the LED in a long-duration original read operation. For this reason, if the same color signal processing is always performed regardless of temperatures, color reproduction of an original image cannot be stably performed.

(8) If variations in spectral characteristics occur between a plurality of R, G, and B LED chips constituting an LED array, a color offset occurs on one original surface. It is therefore difficult to perform uniform color signal processing.

SUMMARY OF THE INVENTION

It is an object of the present invention to provide an image reading apparatus and system which are compact and easy to use.

It is another object of the present invention to decrease the number of steps of assembling an image reading apparatus and system and realize a simple structure.

It is still another object of the present invention to provide a light guide and an illumination device which are compact and have high performance.

In order to achieve the above objects, according to an embodiment of the present invention, there is provided a light guide for guiding light incident from a light source in a longitudinal direction to emit the light in a predetermined direction, wherein at least one end portion of the light guide is bent at a substantially right angle.

According to another embodiment, there is provided an illumination device comprising a light source and a light guide for guiding light incident from the light source in a longitudinal direction to emit the light in a predetermined direction, wherein at least one end portion of the light guide is bent at a substantially right angle.

According to still another embodiment, there is provided an image reading apparatus comprising a light source, a light guide for guiding light irradiated from the light source in a longitudinal direction to emit the light in a predetermined direction so as to irradiate an original with the light, and a light-receiving sensor for receiving the light reflected by the original, wherein at least one end portion of the light guide is bent at a substantially right angle.

According to still another embodiment, there is provided an image reading system comprising a light source, a light guide for guiding light irradiated from the light source in a longitudinal direction to emit the light in a predetermined direction so as to irradiate an original with the light, a light-receiving sensor for receiving the light reflected by the original and outputting an image signal, signal processing means for performing predetermined processing for the image signal, and control means for controlling the light source, the light-receiving sensor, and the signal processing means, wherein at least one end portion of the light guide is bent at a substantially right angle.

With the above arrangement, a compact, easy-to-use image reading apparatus and system can be provided. In addition, the number of steps of assembling the image reading apparatus and system can be decreased, and a simple structure can be realized. Furthermore, a light guide and an illumination device which are compact and have high performance can be provided.

The above and other objects, features, and advantages of the present invention will be apparent from the following detailed description in conjunction with the accompanying drawings and the appended claims.

BRIEF DESCRIPTION OF THE DRAWINGS

FIG. 34 is a block diagram showing the arrangement of an image reading system incorporating an image sensor.

DETAILED DESCRIPTION OF THE PREFERRED EMBODIMENTS

Figure 26:
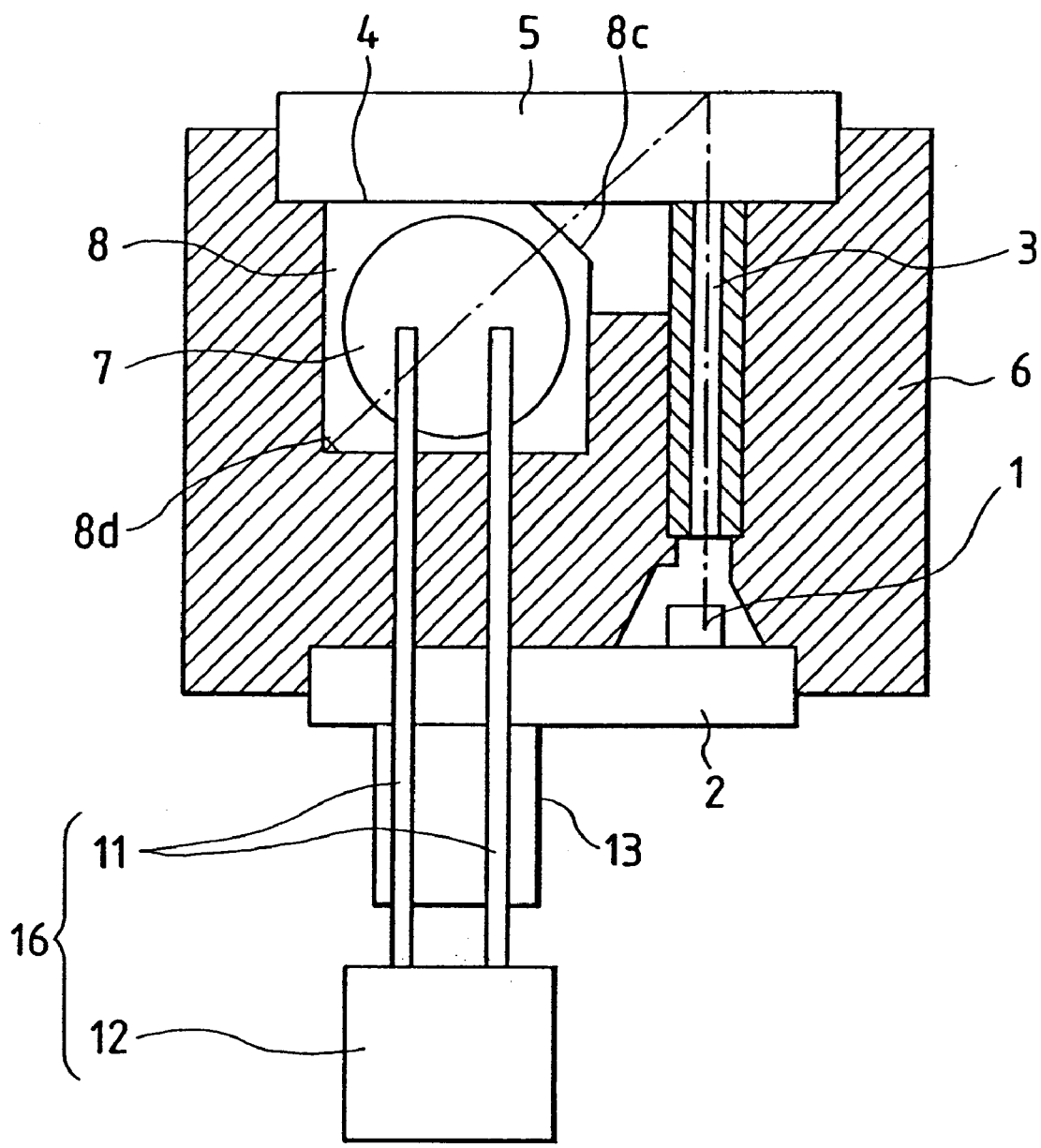
FIG. 26 is a sectional view of the image sensor.
Figure 27:
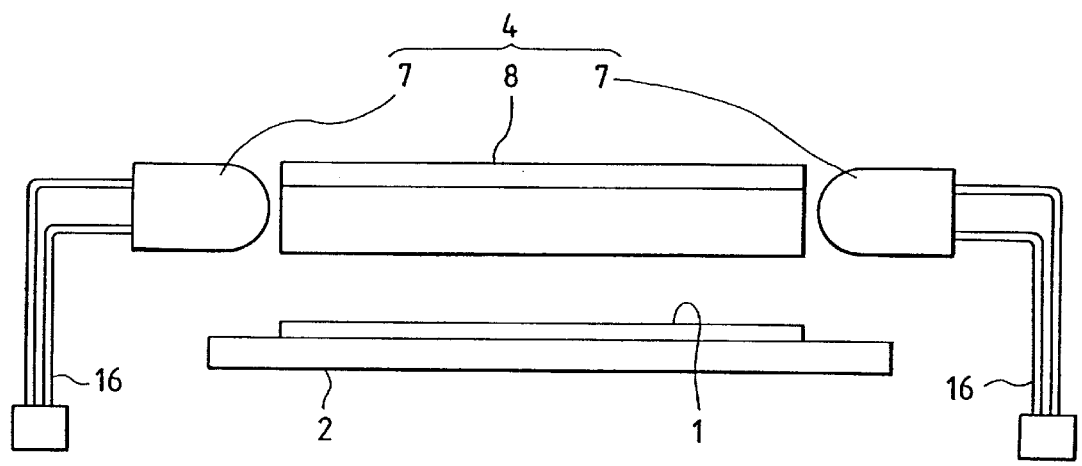
FIG. 27 is a side view of the illumination device portion of the image sensor.
Figure 28:
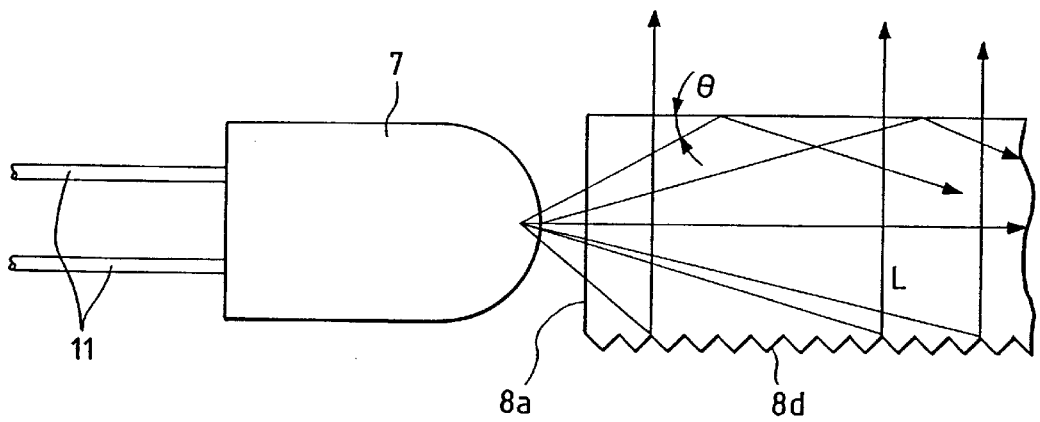
FIG. 28 is an enlarged view of a portion of the illumination device of the image sensor.
Figure 29:
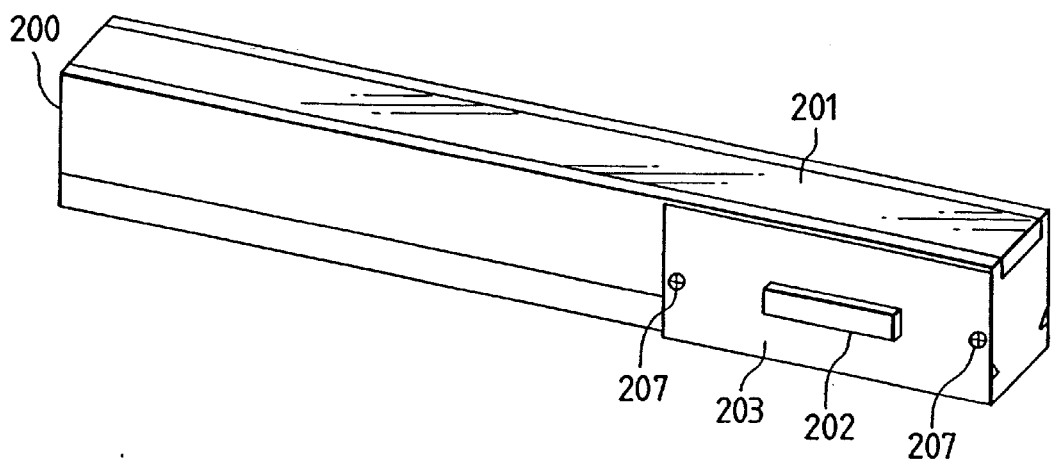
FIG. 29 is a perspective view showing the outer appearance of the light source switching type color image sensor.

FIGS. 1 to 5 show structures of an image sensor associated with the first embodiment of the present invention. The same reference numerals in FIGS. 1 to 5 denote the same parts as in FIGS. 26 to 28.

An image sensor according to this embodiment includes a sensor unit 1 constituted by many photoelectric conversion elements corresponding to the length of an original to be read and accurately arranged in a line on a sensor board 2 made of a glass epoxy material, a glass material, or the like, a lens array 3, an illumination device 4 constituted by LEDs 7 as light sources and a light guide 8, a glass plate 5 used for an original read operation, a frame 6 made of a resin material such as polycarbonate or acrylic and serving to position/hold these components, and a connector 13.

Light emerging from an exit surface 8c of the light guide 8 illuminates an original (not shown) on the glass plate 5 at about 45°. The resultant optical information on the original is formed into an image on the sensor unit 1 through the lens array 3. The sensor unit 1 converts the optical information into an electrical signal and sends it to an external system.

The light guide 8 has transparency for propagation of light. The frame 6 has a light-shielding property to shield the sensor unit 1 against unnecessary external light. According to this embodiment, the light guide 8 is part of the frame 6. More specifically, this structure is a two-color-molded structure including the frame 6 made of black glass-reinforced polycarbonate and the light guide 8 made of transparent acrylic. When an original having a large size (e.g., A3) is to be read, these components are preferably made of materials having linear expansion coefficients which are almost equal to each other in consideration of heat shrinkage. For this reason, transparent and black components may be made of the same material. Alternatively, the light guide 8 and the frame 6 may be separate parts.

Instead of forming a two-color-molded structure using different materials as in the above case, a corresponding structure may be formed by using the same material, and then light-shielding, reflection, and diffusion means are applied to the structure to add the respective functions thereto. For example, coating of a black coating material may be performed as the light-shielding means; deposition of aluminum, as the reflection means; and coating of a white coating material or a satin finish process, as the diffusion means.

Figure 2:
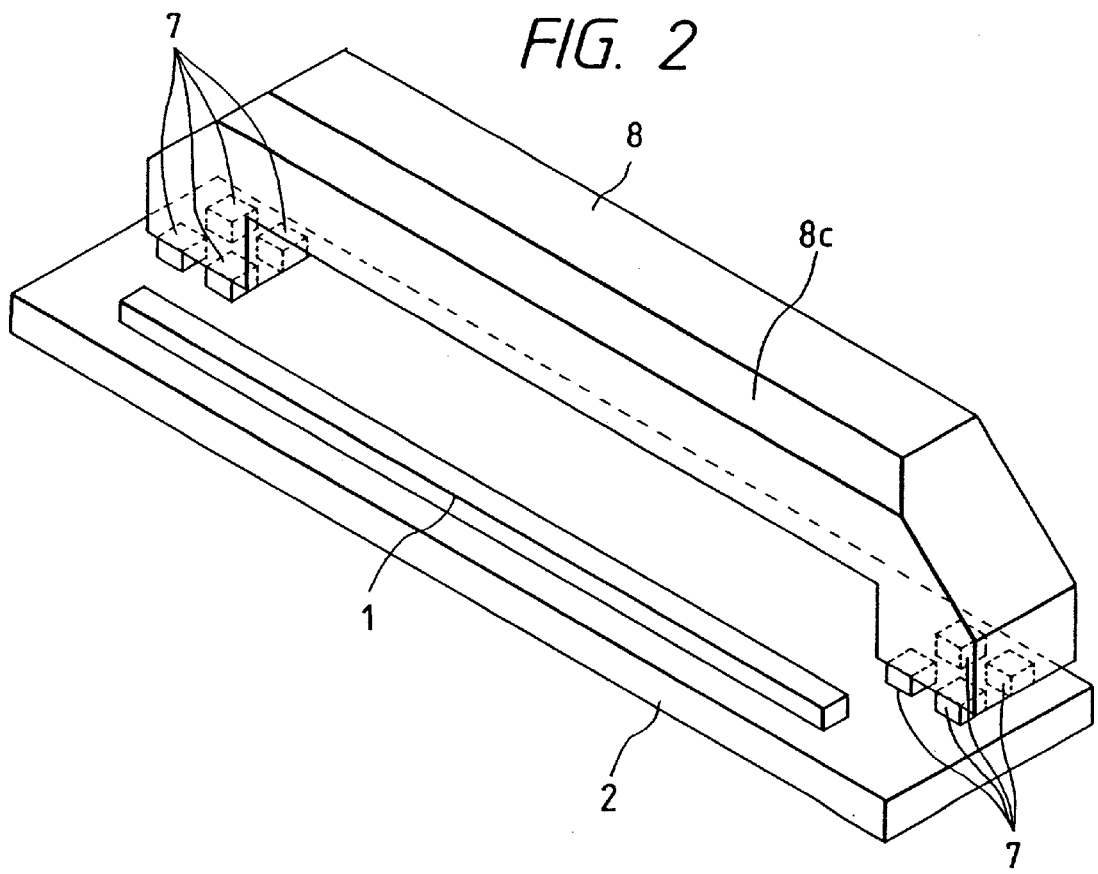
FIG. 2 is a perspective view of the image sensor according to the first embodiment.
Figure 3:
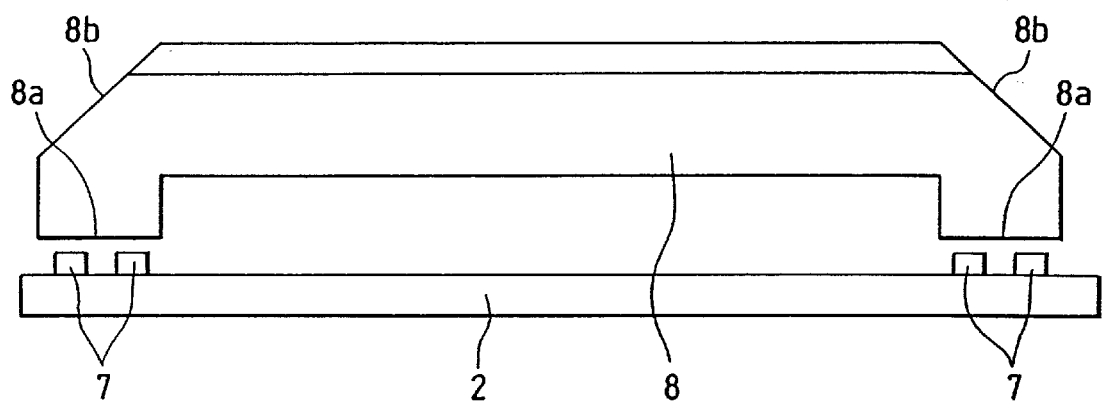
FIG. 3 is a side view of the illumination device portion of the image sensor according to the first embodiment.

As shown in FIGS. 2 and 3, the two end portions of the light guide 8 are bent at right angles toward the sensor board 2, and the surfaces of the light guide 8 which oppose the sensor unit 1 are defined as incident surfaces 8a on which light beams from the LEDS are incident.

The LEDs 7 are placed on the sensor board 2 to oppose the incident surfaces 8a on the two ends of the light guide 8 so as to irradiate light beams on the incident surfaces 8a. The main irradiation surface of each sensor 7 almost coincides with the optical information incident surface of the sensor unit 1. A diffusion surface 8d is formed n the light guide 8. In this case, the LEDs 7 are arranged at the two ends of the light guide 8. However, the LEDs 7 may be arranged at only one side of the light guide 8, and a reflecting surface may be formed on the other end of the light guide 8. In such a case, only the end portion of the light guide 8 at which the LEDs 7 are arranged may be bent. In addition, the sensor unit 1 and each LED 7 are connected to the external system through one connector 13.

Figure 4:
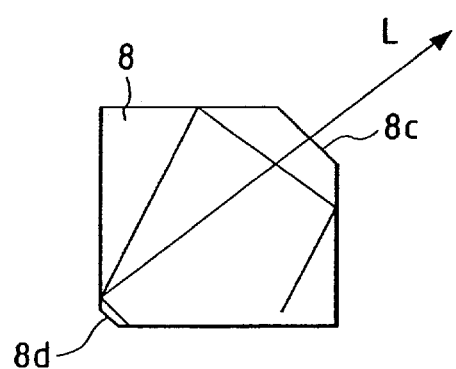
FIG. 4 is a sectional view of the light guide of the image sensor according to the first embodiment.
Figure 5:
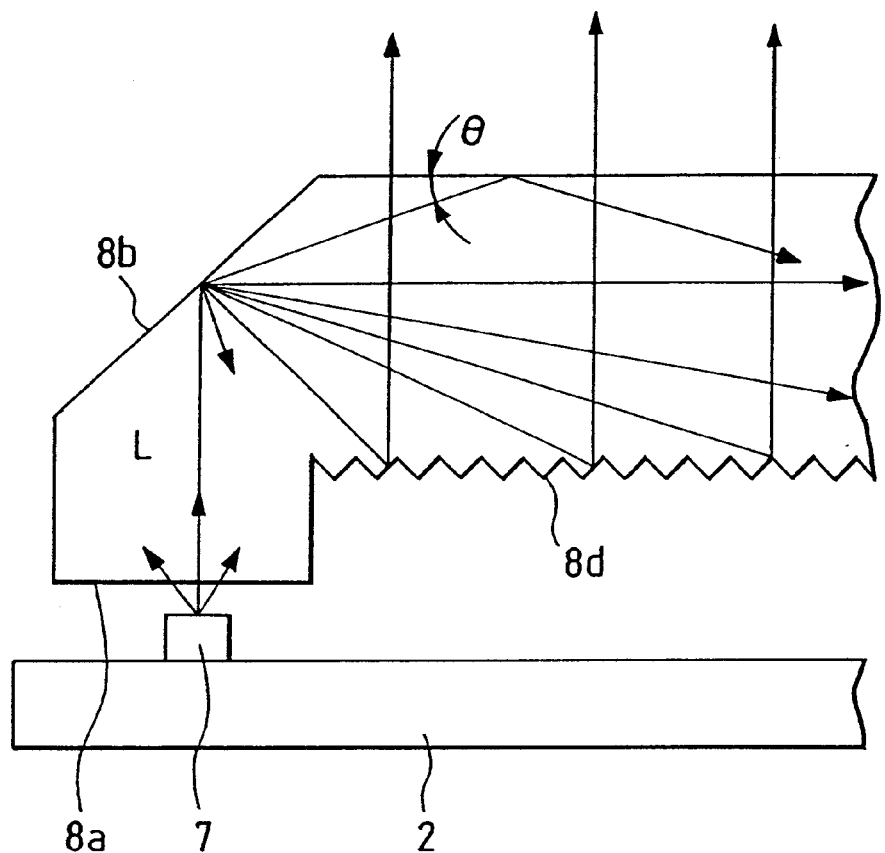
FIG. 5 is an enlarged view of a portion of the illumination device of the image sensor according to the first embodiment.

According to the above structure, as shown in FIGS. 4 and 5, light L emitted from the LED 7 enters the light guide 8 through the incident surface 8a and is reflected by a first reflecting surface 8b along the longitudinal direction (to the right in FIG. 5) of the light guide 8. The diffusion surface 8d is constituted by fine tapered portions continuously formed in the longitudinal direction of the light guide 8. Light that is incident on the surface of each tapered portion of the light guide 8 at an incident angle θ of 49° or less (when the light guide 8 is made of an acrylic resin and has a refractive index n=1.5) satisfies the total reflection angle condition and emerges in a desired direction. The incident light diffused by the diffusion surface 8d emerges from the light guide 8 through the exit surface 8c opposing the diffusion surface 8d. The light then illuminates the original through the glass plate 5. The reflected light from the original propagates in a direction almost parallel with the irradiation direction of each LED 7, and reaches the sensor unit 1.

Note that the diffusion surface 8d need not always oppose the exit surface 8c. By changing the characteristics of the diffusion surface, light can be diffused in a desired direction.

Figure 1:
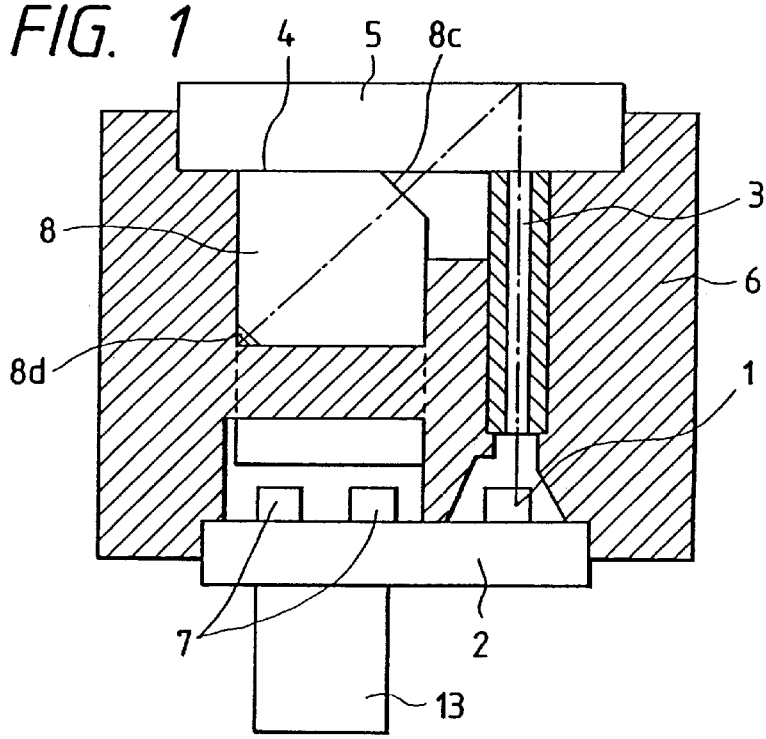
FIG. 1 is a sectional view of an image sensor according to the first embodiment.

A method of manufacturing the image sensor will be described next with reference to FIG. 1.

The lens array 3 is inserted into the frame 6 to be mounted at a predetermined position. In this case, since the light guide 8 is integrated with the frame 6, the lens array 3 and the light guide 8 can be positioned with high precision. The glass plate 5 is bonded to the frame 6, which clamps the lens array 3, with an adhesive in a plane approximately the same as the upper surface of the lens array 3 inserted into the frame 6. The sensor board 2 on which the LEDs 7 and the sensor unit 1 are mounted is inserted into the frame 6. At this time, the LEDs 7 on the sensor board 2 are placed to oppose the incident surfaces 8a of the light guide 8.

The present invention can be applied to an image sensor using a reduction system lens or a perfect contact image sensor using no lens.

According to this embodiment, since the main irradiation direction of each LED 7 is almost parallel with the incident direction of the sensor unit 1, and the LEDs 7 are arranged on the sensor board 2 at least at one end in the longitudinal direction, no connector cable for a light source is required, and electrical connection between the image sensor and the external system can be performed by using one connector 13. For this reason, electrical connection can be performed with a simple structure, and the influences of noise can be reduced. In addition, the space efficiency improves to attain a reduction in size. Furthermore, since an illuminance adjustment circuit for each LED 7 can be arranged on the sensor board 2, variations in sensor outputs (sensor lightness outputs) obtained when image sensors read a white original can be reduced. Moreover, since the light guide 8 and the frame 6 can be integrally formed, the assembly process and illumination optical axis alignment are simplified. As a result, a reduction in cost can be attained. Especially when light sources of three colors (R, G, and B) are to be used for a color image read operation, the number of LEDs and the number of cables connected increase. In this case, therefore, the above effects are remarkable.

The second and third embodiments of the present invention will be described next.

Figure 6:
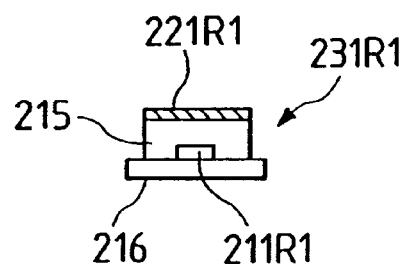
FIG. 6 is a sectional view of an LED board as a constituent element of a light source switching type multichip color image sensor according to the second embodiment.

FIG. 6 shows the characteristics of the second embodiment most clearly. Referring to FIG. 6, an R LED 231R1 has a transparent resin 215 and a color filter 221R1 mounted on an LED chip 211R1. The LED chip 211R1 is mounted on an LED base 216.

Figure 7:
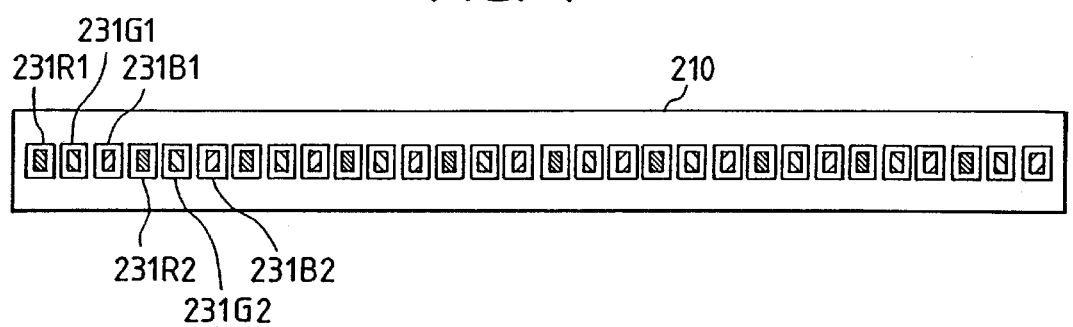
FIG. 7 is a plan view of the LED board as a constituent element of the light source switching type multichip color image sensor according to the second embodiment.

FIG. 7 shows the arrangement of LEDs on an LED board 210. Referring to FIG. 7, transparent resins 215 are mounted on LED chips 211R1, 211R2, . . . , color filters 221R1, 221R2, . . . are also mounted on the transparent resins 215, the resultant structures are then mounted on bases 216, thereby forming R LEDs 231R1, 231R2, . . . G LEDs 231G1, 231G2, . . . are formed by mounting transparent resins 215 on LED chips 211G1, 211G2, . . . , mounting color filters 221G1, 221G2, . . . , and mounting the resultant structures on bases 216. B LEDs 231B1, 231B2, . . . are formed by mounting transparent resins 215 on LED chips 211B1, 211B2, . . . , mounting color filters 221B1, 221B2, . . . , and mounting the resultant structures on bases 216. These R, G, and B LEDs are alternately arranged in a line on the LED board 210.

Figure 8:
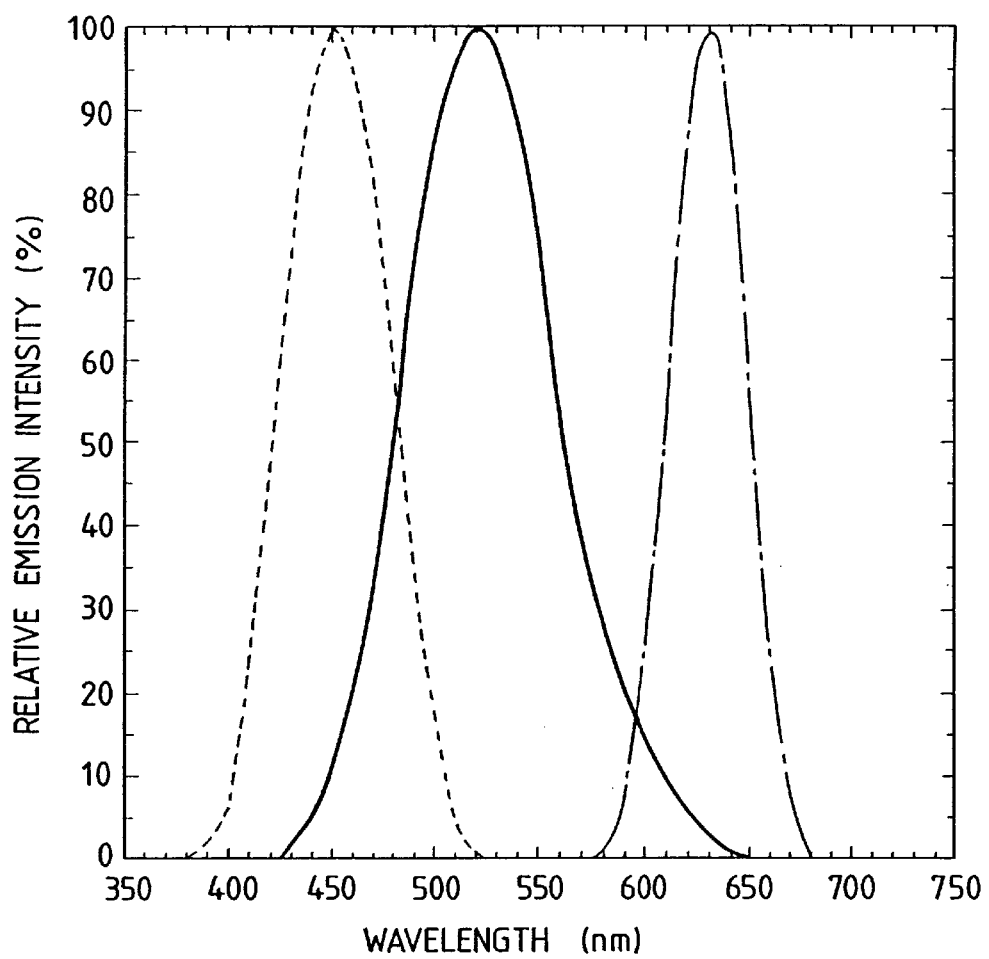
FIG. 8 is a graph showing the spectral radiation characteristics of R, G, and B LED chips.

FIG. 8 shows the spectral radiation characteristics of the LED chips 211R1, 211R2, . . . , 211G1, 211G2, . . . , and 211B1, 211B2, . . . . The spectral radiation characteristics are the same as those in the related art. The color filters 221R1, 221R2, . . . , 221G1, 221G2, . . . , and 221B1, 221B2, . . . have spectral transmission characteristics like those shown in FIG. 9.

Figure 30:
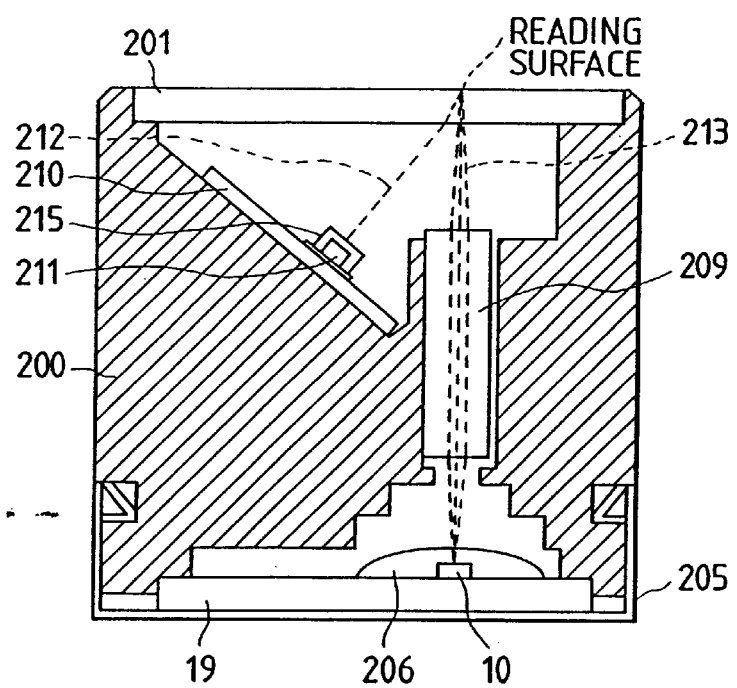
FIG. 30 is a sectional view of the light source switching type color image sensor according to the second embodiment and the related art.
Figure 31:
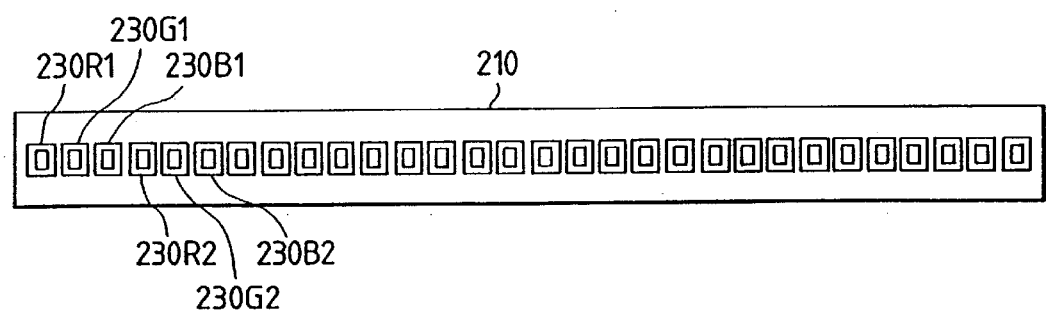
FIG. 31 is a plan view of an LED array on an LED board as a constituent element of the light source switching type color image sensor.
Figure 32:
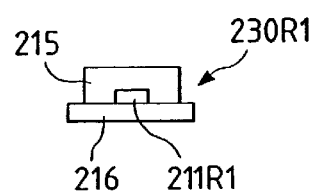
FIG. 32 is a sectional view of an LED board as a constituent element of the light source switching type color image sensor.
Figure 33:
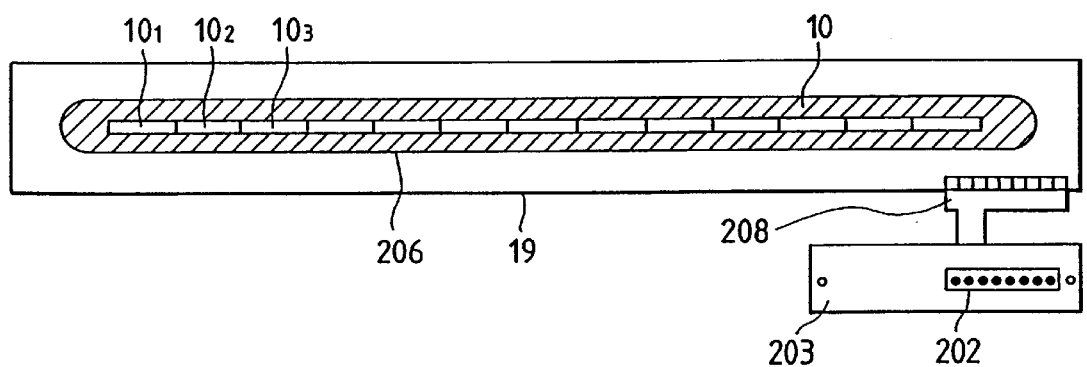
FIG. 33 is a plan view showing the outer appearance of a board on which a sensor array as a constituent element of the light source switching type color image sensor is mounted.

In this embodiment, the LED board 210 shown in FIG. 7 is mounted in the apparatus in place of the LED board 210 shown in FIGS. 30 and 31.

Figure 10:
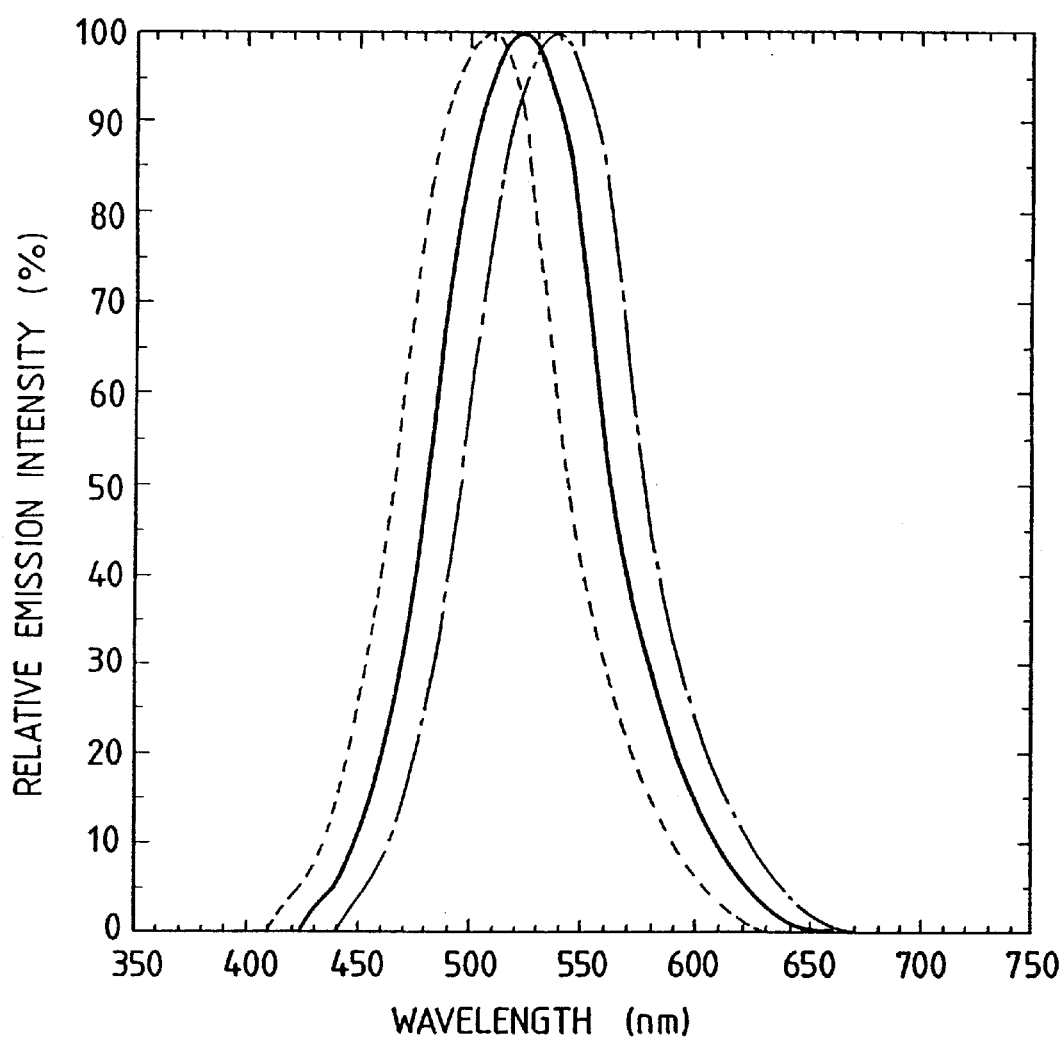
FIG. 10 is a graph showing variations in the spectral radiation characteristics of a G LED chip in the second embodiment.

The influences of variations in the characteristics of LED chips serving as light sources on a color image read operation will be described next by taking G LEDs as an example. The solid line in FIG. 10 exemplifies the spectral radiation characteristics of an LED chip for emitting G light. Variations in spectral characteristics due to manufacturing variations are inevitable among a plurality of G LED chips required to constitute an LED array like the one shown in FIG. 7. Referring to FIG. 10, the characteristics represented by the dotted and chain lines are based on such variations in spectral characteristics. More specifically, these characteristics are obtained by shifting the characteristics represented by the solid line by a predetermined amount on the short-wavelength side and the long-wavelength side.

Consider variations in the color space of a color image sensor, which occur in accordance with variations in the spectral radiation characteristics of G LED chips constituting an LED array, when only the transparent resin 215 is mounted on each LED chip to from a light source.

Figure 12:
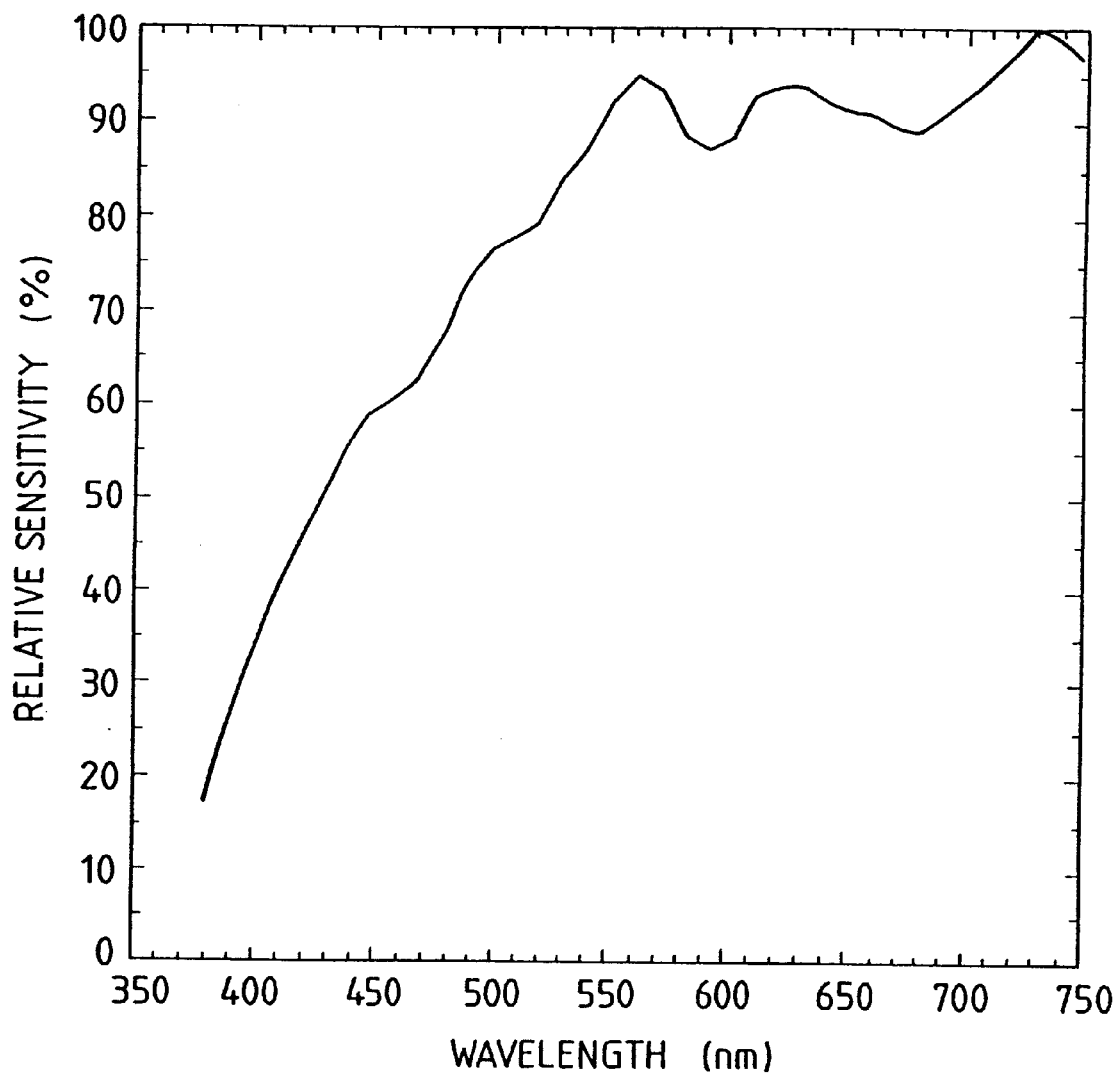
FIG. 12 is a graph showing the spectral sensitivity characteristics of a line sensor as a constituent element of a light source switching type color image sensor.

The three stimulus values of a G signal in the above color image sensor are obtained according to the following equations:

$$Xg = K \int LEDG(\lambda) S(\lambda) WS(\lambda) x(\lambda) d\lambda$$

$$Yg = K \int LEDG(\lambda) S(\lambda) WS(\lambda) y(\lambda) d\lambda$$

$$Zg = K \int LEDG(\lambda) S(\lambda) WS(\lambda) z(\lambda) d\lambda \qquad (1)$$

where K is a constant, LEDG($\lambda$) is the spectral radiation characteristics of a GLED chip in FIG. 8, S($\lambda$) is the spectral sensitivity characteristics of a line sensor in FIG. 12; WS($\lambda$) is the spectral radiation characteristics of a white reference, and x($\lambda$), y($\lambda$), and z($\lambda$) are the color matching functions of the XYZ standard calorimetric system.

Figure 13:
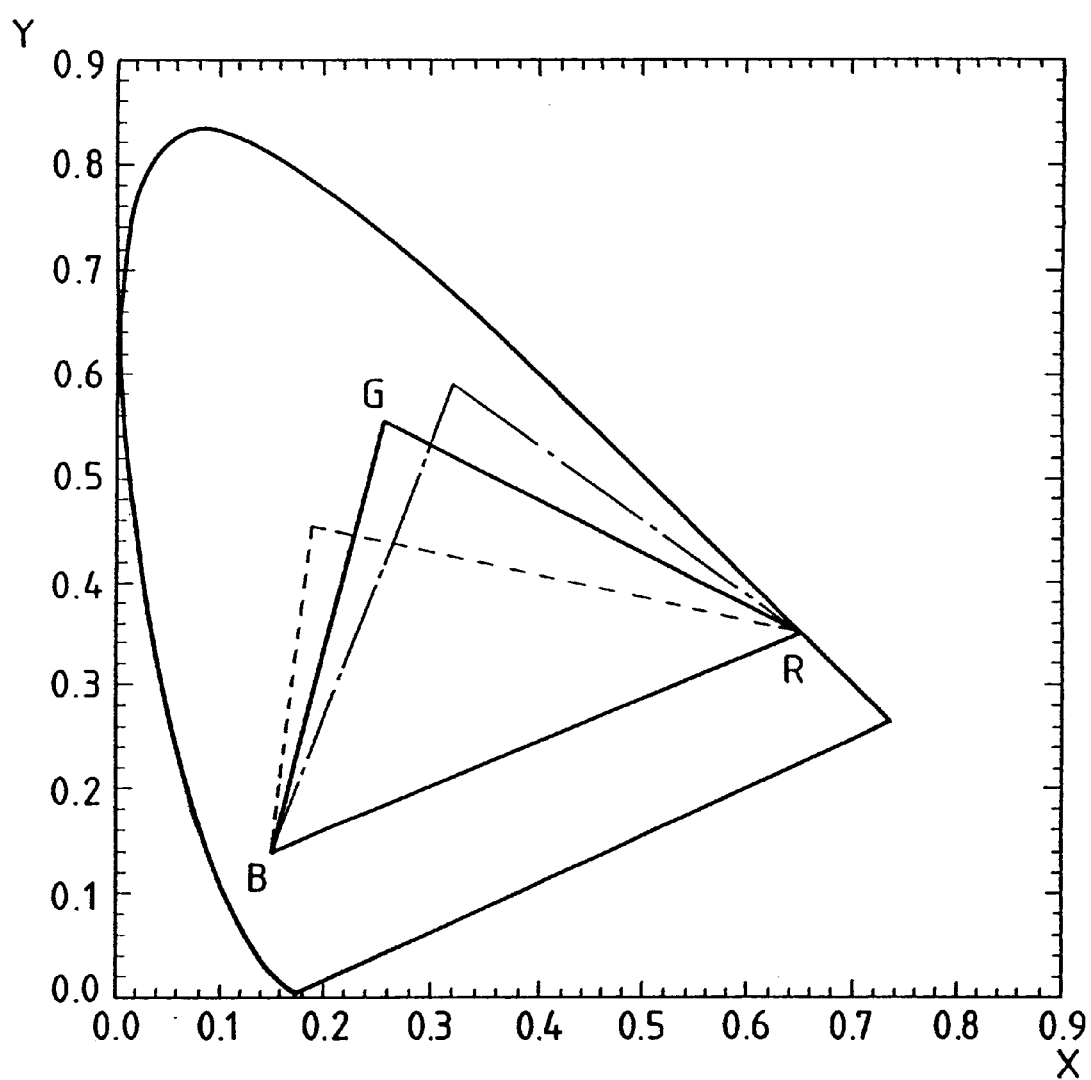
FIG. 13 is a graph showing variations in the color space of the color image sensor, which are caused by variations in the spectral radiation characteristics of the G LED chips in the second embodiment.

The three stimulus values of each of R and B signals are obtained in the same manner. As a result, the color space of the color image sensor is obtained. For the sake of simplicity, assume that R and B LEDs have constant characteristics without variations. In this case, the color space of the color image sensor varies in accordance with variations in the spectral radiation characteristics of the G LED chips, as shown in FIG. 13. Referring to FIG. 13, the solid line, the dotted line, and the chain line correspond to those in FIG. 10.

Figure 11:
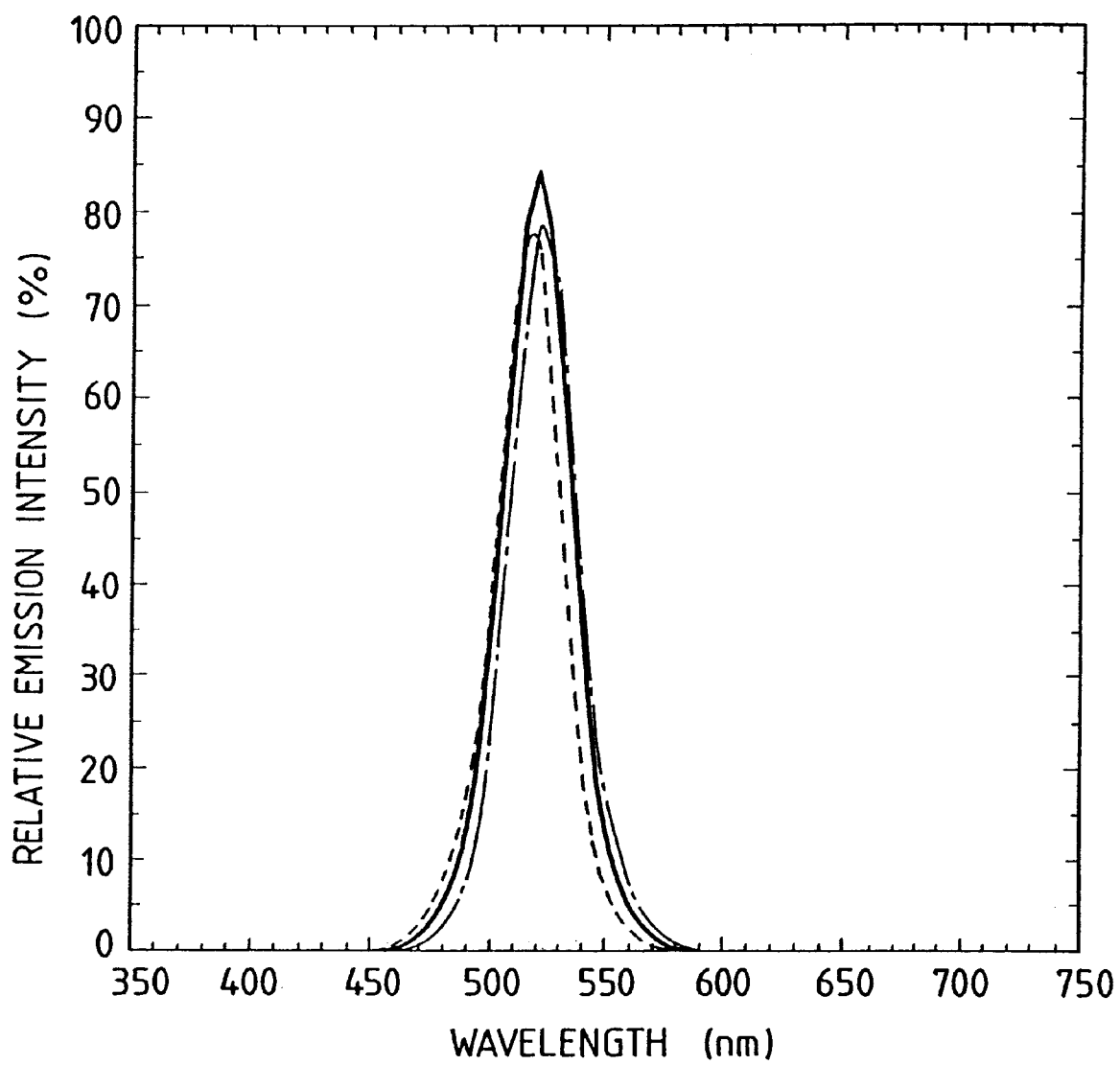
FIG. 11 is a graph showing variations in the spectral radiation characteristics of a G LED with a color filter in the second embodiment.
Figure 15:
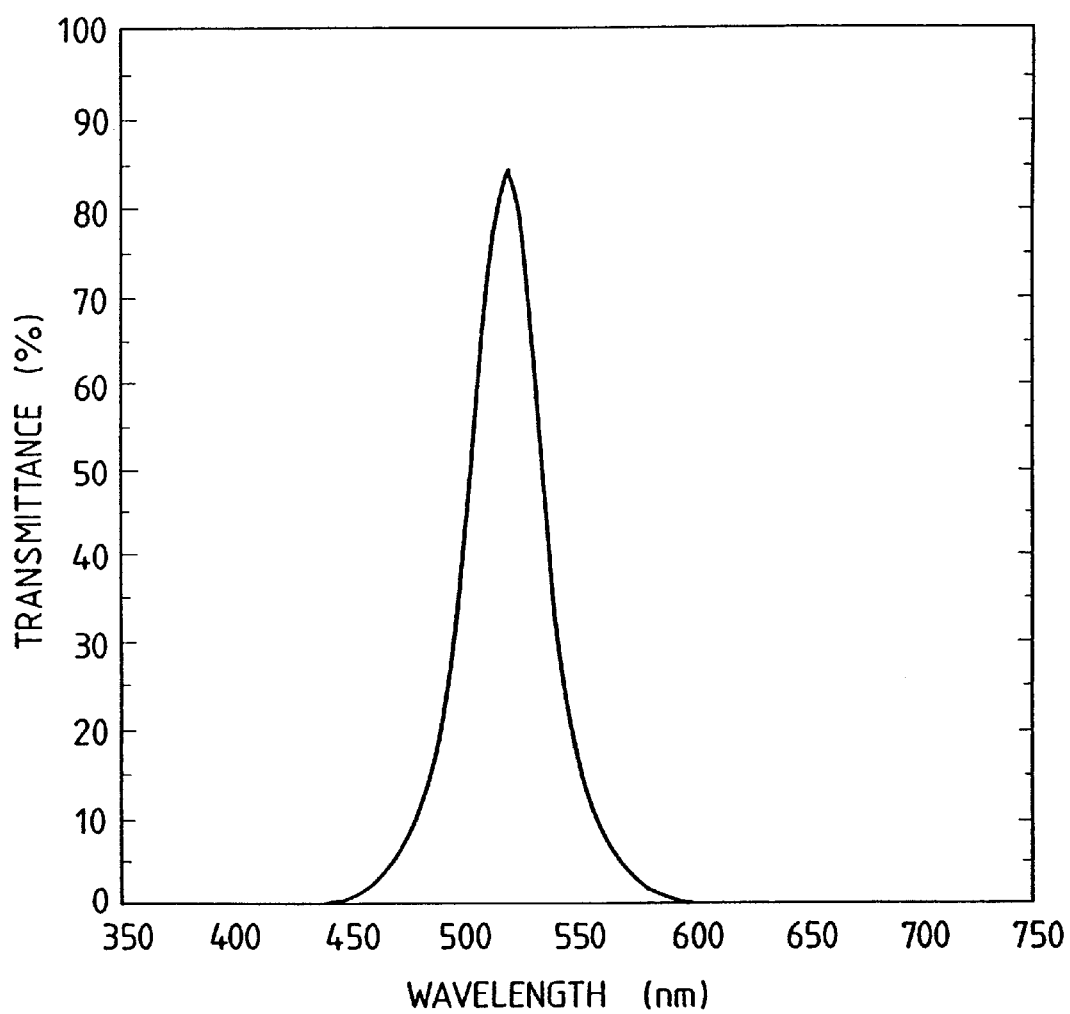
FIG. 15 is a graph showing the spectral transmission characteristics of a G filter placed on the emission surface side of a G LED chip in the second embodiment.

Consider next the color space of a color image sensor having a color filter 221 mounted on a transparent resin 215 covering each LED chip as in this embodiment. In general, the uniformity of the spectral transmission characteristics of color filters is high in the same production lot; variations in spectral transmission characteristics are negligible as compared with variations in spectral radiation characteristics among the LED chips 211G1, 211G2, . . . . For this reason, the spectral transmission characteristics of the color filters 221G1, 221G2, . . . are considered as uniform, as shown in FIG. 15. In this case, the spectral radiation characteristics of the G LEDs with the color filters are shown in FIG. 11 in correspondence with FIG. 10.

In this case, the three stimulus values of a G signal are obtained according to the following equations:

$$Xg = K \int LEDG(\lambda) GF(\lambda) S(\lambda) WS(\lambda) x(\lambda) d\lambda$$

$$Yg = K \int LEDG(\lambda) GF(\lambda) S(\lambda) WS(\lambda) y(\lambda) d\lambda$$

$$Zg = K \int LEDG(\lambda) GF(\lambda) S(\lambda) WS(\lambda) z(\lambda) d\lambda \qquad (2)$$

where GF($\lambda$) is the spectral transmission characteristics of a G color filter in FIG. 15.

Figure 14:
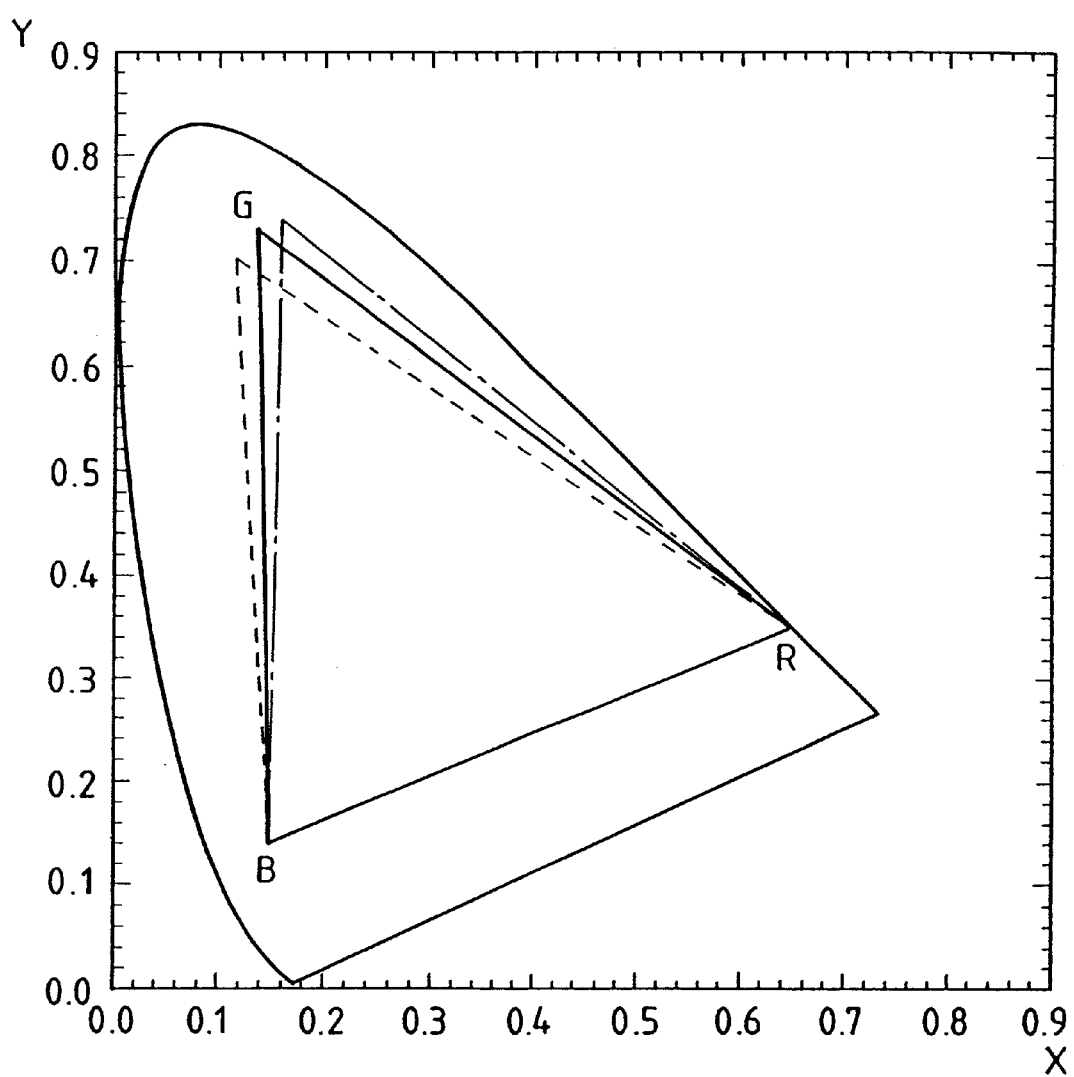
FIG. 14 is a graph showing variations in the color space of the color image sensor, which are caused by variations in the spectral radiation characteristics of the G LED chips with color filters in the second embodiment.

When the color space of the color image sensor is obtained on the basis of the three stimulus values of the G signal in the same manner as described above, the color space of the color image sensor varies as shown in FIG. 14 in correspondence with the variations in the spectral radiation characteristics of the G LEDs in FIG. 11. Referring to FIG. 14, the solid line, the dotted line, and the chain line correspond to those in FIGS. 10 and 11.

As is apparent from comparison between the characteristics in FIGS. 13 and 14, variations in the color space of the image sensor due to variations in spectral radiation characteristics of the LED chips can be suppressed by mounting the color filters 221 on the emission surfaces. Even if, therefore, variations in spectral characteristics occur among a plurality of LED chips which are simultaneously turned on in one LED array for irradiating an original surface, light having relatively uniform spectral characteristics is irradiated on the original surface. In addition, since the spectral characteristics of light irradiated on an original are uniform among many color image sensors, color signals can be stably obtained by the same signal processing. For this reason, color scanners can be easily formed without requiring any adjustment.

Referring to FIG. 14, the color purity of each of R, G, and B irradiation light beams improves, and a wide color space can be set owing to the effects of the color filters 221R1, 221R2, . . . , 221G1, 221G2, . . . , and 221B1, 221B2, . . . , in comparison with the color space of the color image sensor in FIG. 13. When, therefore, an original is irradiated with light emitted from each LED chip through the color filter 221, the color reproducibility improves, and a color image sensor with small variations in color space can be realized.

Figure 16:
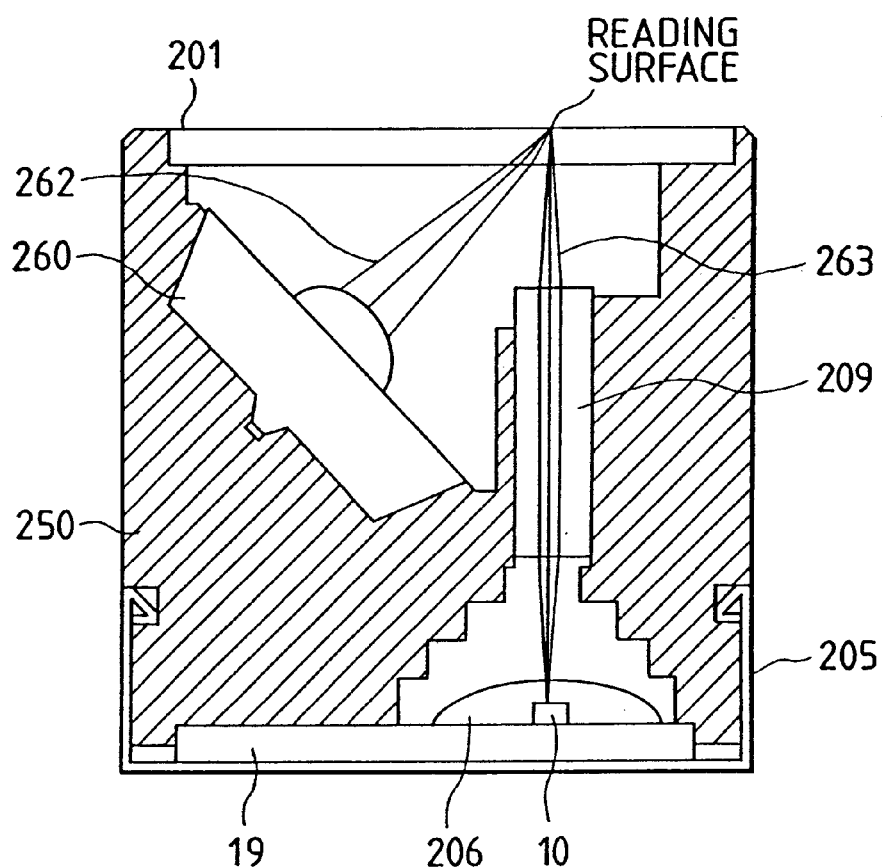
FIG. 16 is a sectional view of a light source switching type color image sensor according to the third embodiment.

FIG. 16 is a sectional view of a light source switching type color image sensor according to the third embodiment of the present invention. Referring to FIG. 16, this sensor includes a frame 250 and a light source device 260 for emitting light from a side surface of a light-transmitting member (to be described later). Light 262 is emitted from the light source device 260 and reflected by an original surface to become reflected light 263. Other portions correspond to those in FIG. 30.

Figure 17:
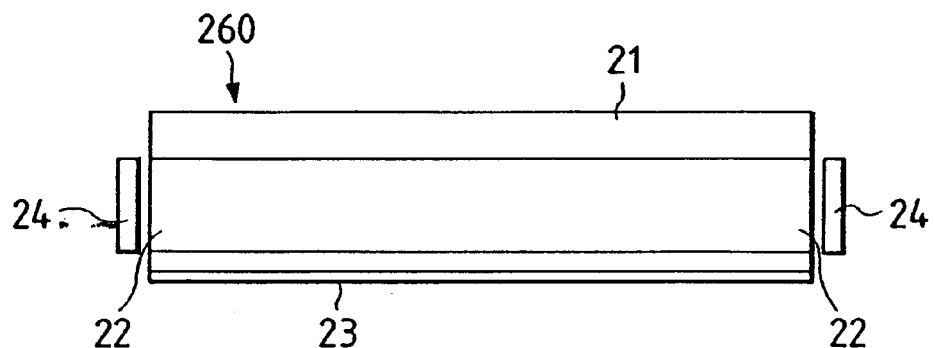
FIG. 17 is a front view of a light source in the third embodiment.
Figure 18:
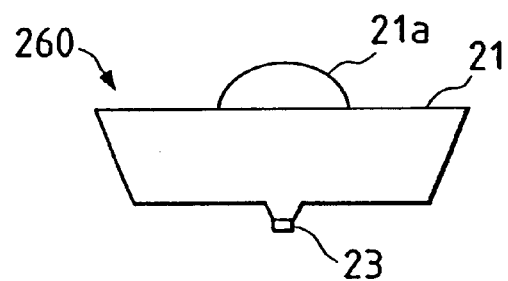
FIG. 18 is a sectional view of a light-transmitting member for illuminating an original in the light source switching type color image sensor according to the third embodiment.

FIGS. 17 and 18 are sectional and front views, respectively, of the light source device 260. Referring to FIGS. 17 and 18, a light-transmitting member 21 has an exit portion 21a. The light source device 260 has incident surfaces 22 through which light beams enter the light-transmitting member 21. An irradiation portion 23 is formed by, e.g., a means for coating the surface of a projection formed on the light-transmitting member 21 with a coating material having light diffusion/reflection characteristics. The irradiation portion 23 serves to irradiate an original with reflected light. LED boards 24 are placed at the two longitudinal end faces of the light-transmitting member 21. The LED boards 24 emit light incident on the incident surfaces 22.

Figure 9:
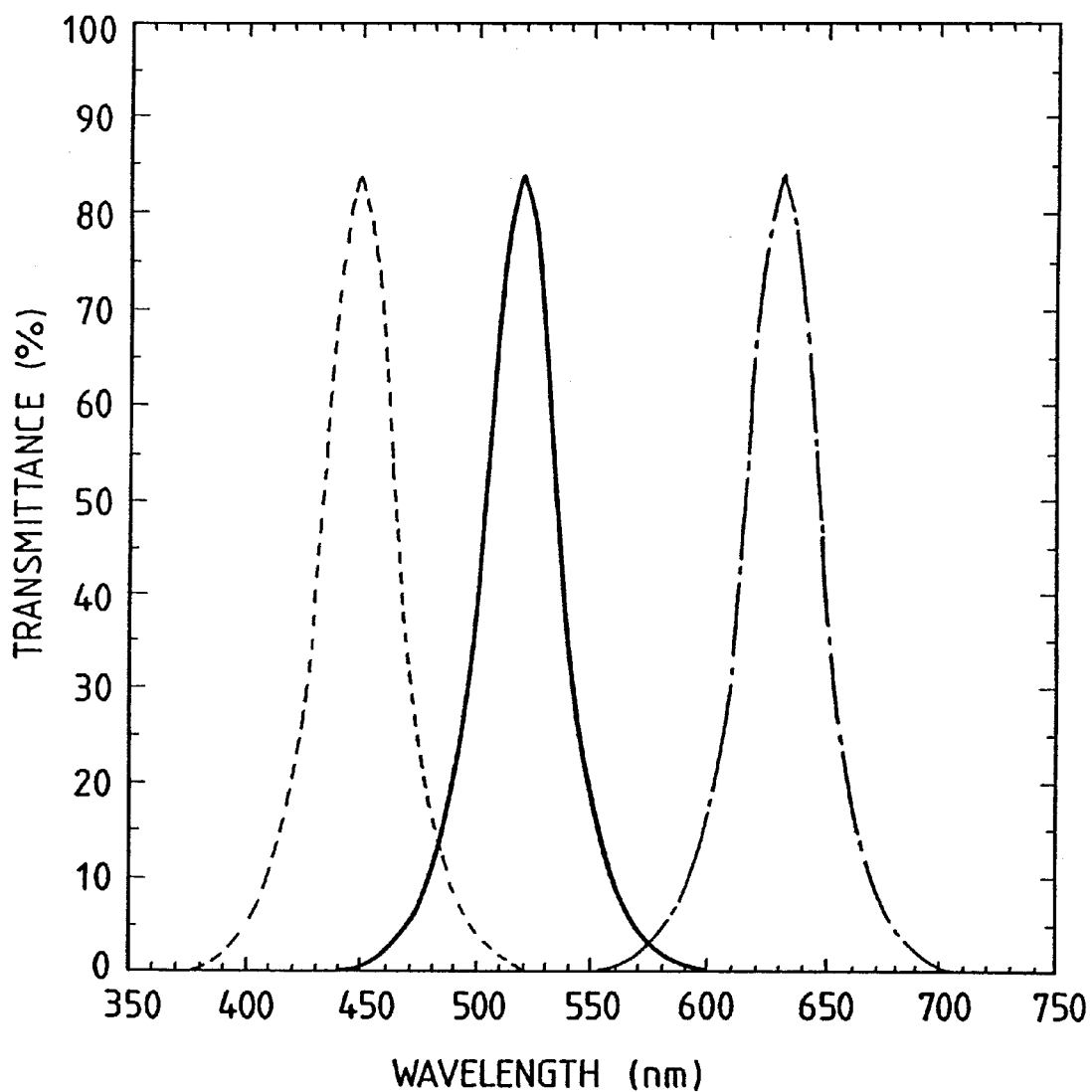
FIG. 9 is a graph showing the spectral transmission characteristics of R, G, and B filters arranged on the emission surface sides of R, G, and B LED chips in the first embodiment and colored transparent resins covering R, G, and B LED chips in the second embodiment.
Figure 19:
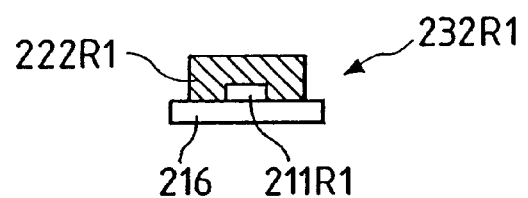
FIG. 19 is a sectional view of an LED board as a constituent element of the light source switching type color image sensor according to the third embodiment.

FIG. 19 is a sectional view of an LED placed on the LED board 24, and more specifically, an LED 232R1 for emitting R light. Referring to FIG. 19, one LED chip 211R1 is mounted on one LED base 216, and a transparent resin 222R used as a color filter colored to have R spectral transmission characteristics is mounted on the LED chip 211R1. Similarly, an LED 232G1 for emitting G light is formed as follows. One LED chip 211G1 is mounted on one LED base 216, and a transparent resin 222G colored to have G spectral transmission characteristics is mounted on the LED chip 211G1. An LED 232B1 for emitting B light is formed as follows. One LED chip 211B1 is mounted on one LED base 216, and a transparent resin 222B colored to have B spectral transmission characteristics is mounted on the LED chip 211B1. The spectral transmission characteristics of the colored transparent resins 222R, 222G, and 222B are the same as those of the color filters 221R, 221G, and 221B in the first embodiment. FIG. 9 shows these characteristics.

Figure 20:
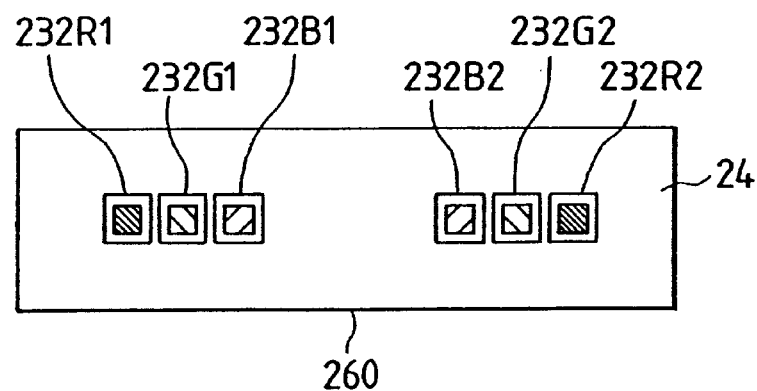
FIG. 20 is a plan view of an LED board as a constituent element of the light source switching type color image sensor according to the third embodiment.

The LEDs 232R1, 232R2, 232G1, 232G2, 232B1, and 232B2, each formed by mounting one L chip on one LED base and mounting the transparent resin 222 colored to have desired spectral transmission characteristics on the LED chip, are mounted on the LED board 24, as shown in FIG. 20.

Figure 21:
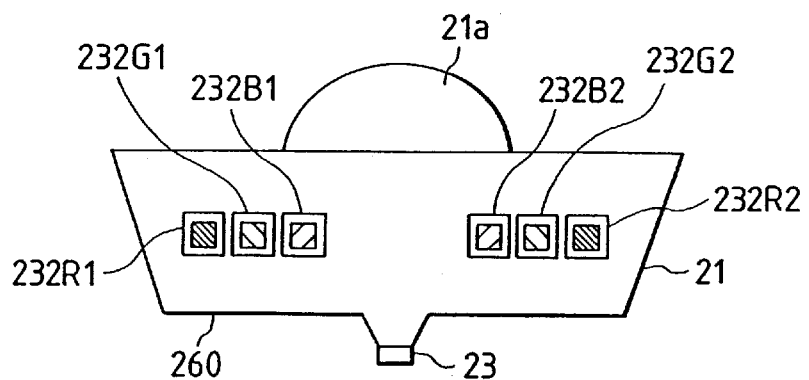
FIG. 21 is a side view showing the positional relationship between a light-transmitting member and an LED chip mounted on an LED board in the light source switching type color image sensor according to the third embodiment.

FIG. 21 shows the positional relationship between the light-transmitting member 21 and the LEDs 232R1, 232G1, 232B1, 232R2, 232G2, and 232B2 in a state in which the LED boards 24 are mounted at the incident surfaces 22 of the two ends of the light-transmitting member 21. Referring to FIG. 21, light beams emitted from the LEDs 211R1, 211G1, 211B1, 211R2, 211G2, and 211B2 enter the light-transmitting member 21 through each incident surface 22, and propagate while being repeatedly reflected by the interior of the light-transmitting member 21. The light beams which are incident on the irradiation portion 23 during propagation are diffused/reflected to be irradiated on the original surface through the exit portion 21a.

This apparatus is designed to sufficiently decrease the amount of light beams emitted from the LEDs 211R1, 211G1, 211B1, 211R2, 211G2, and 211B2 and directly irradiated on the irradiation portion 23. The light beams incident on the irradiation portion 23 are indirect light beams reflected by the interior of the light-transmitting member 21. The illuminance on the original surface in the longitudinal direction of the light-transmitting member 21 is therefore highly uniform.

In the third embodiment, since light from one LED is uniformly irradiated on an original surface, as described above, even if the spectral radiation characteristics of a plurality of LEDs for emitting light beams to obtain one color signal vary, the spectral characteristics of illumination light within the plane of the original are uniform. If, however, the operating temperature of the color image sensor changes, the spectral radiation characteristics of the R, G, and B LED chips in FIG. 8 shift to the characteristics indicated by the dotted lines in FIG. 22. In this case, if the spectral transmission characteristics of the colored transparent resins 222 remain the same, the spectral radiation characteristics of the R, G, and B LEDs with the colored transparent resins change with respect to the changes in characteristics in FIG. 22, as shown in FIG. 23.

Figure 22:
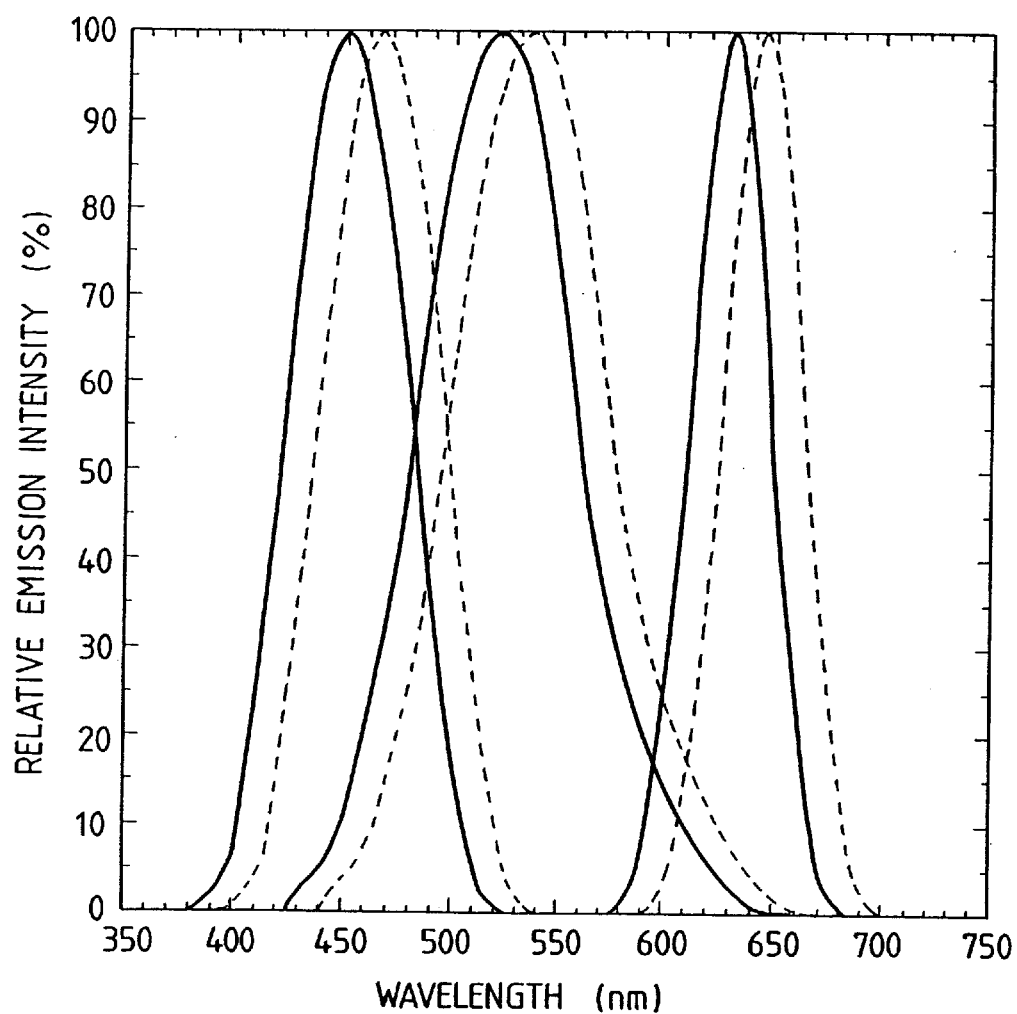
FIG. 22 is a graph showing shifts in the spectral radiation characteristics of R, G, and B LED chips with rises in temperature in the third embodiment.
Figure 23:
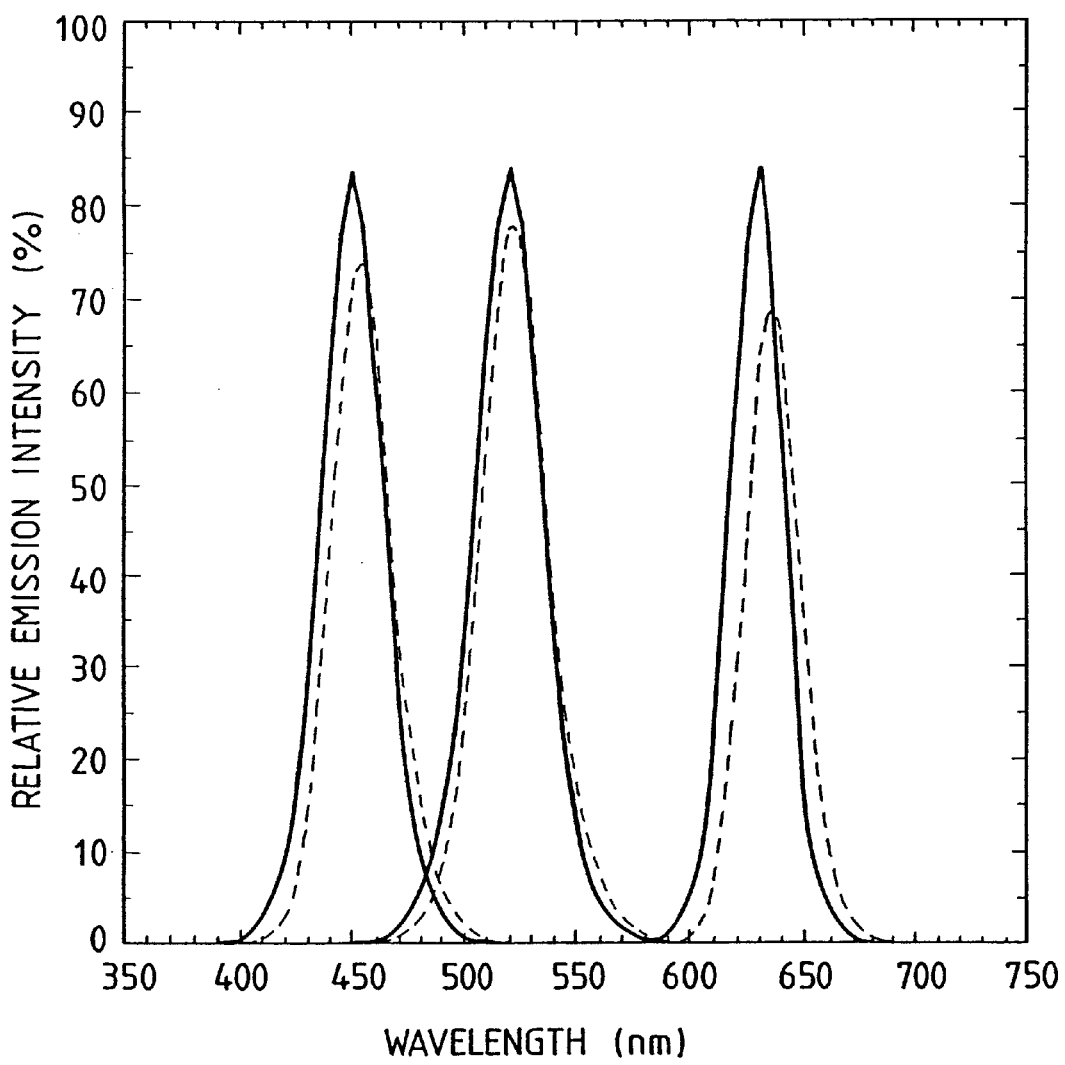
FIG. 23 is a graph showing shifts in the spectral radiation characteristics of R, G, and B LED chips having color filters with rises in temperature in the third embodiment.

The influences of changes in the spectral radiation characteristics of R, G, and B light sources having the colored transparent resins 222 and those of R, G, and B light sources having noncolored transparent resins 222 with changes in operating temperature, which are shown in FIGS. 22 and 23, on the original read operation of the color image sensor will be considered in the same manner as in the first embodiment. When changes in the color space of the color image sensor which correspond to changes in characteristics in FIGS. 22 and 23 are obtained in the same manner as in the first embodiment, changes in the color space of the color image sensor with changes in the characteristics of the R, G, and B LEDs in FIG. 22 become those shown in FIG. 24. Changes in the color space of the color image sensor with changes in the characteristics of the R, G, and B LEDs in FIG. 23 become those shown in FIG. 25. The solid and dotted lines in FIGS. 24 and 25 correspond to those in FIGS. 22 and 23.

Figure 24:
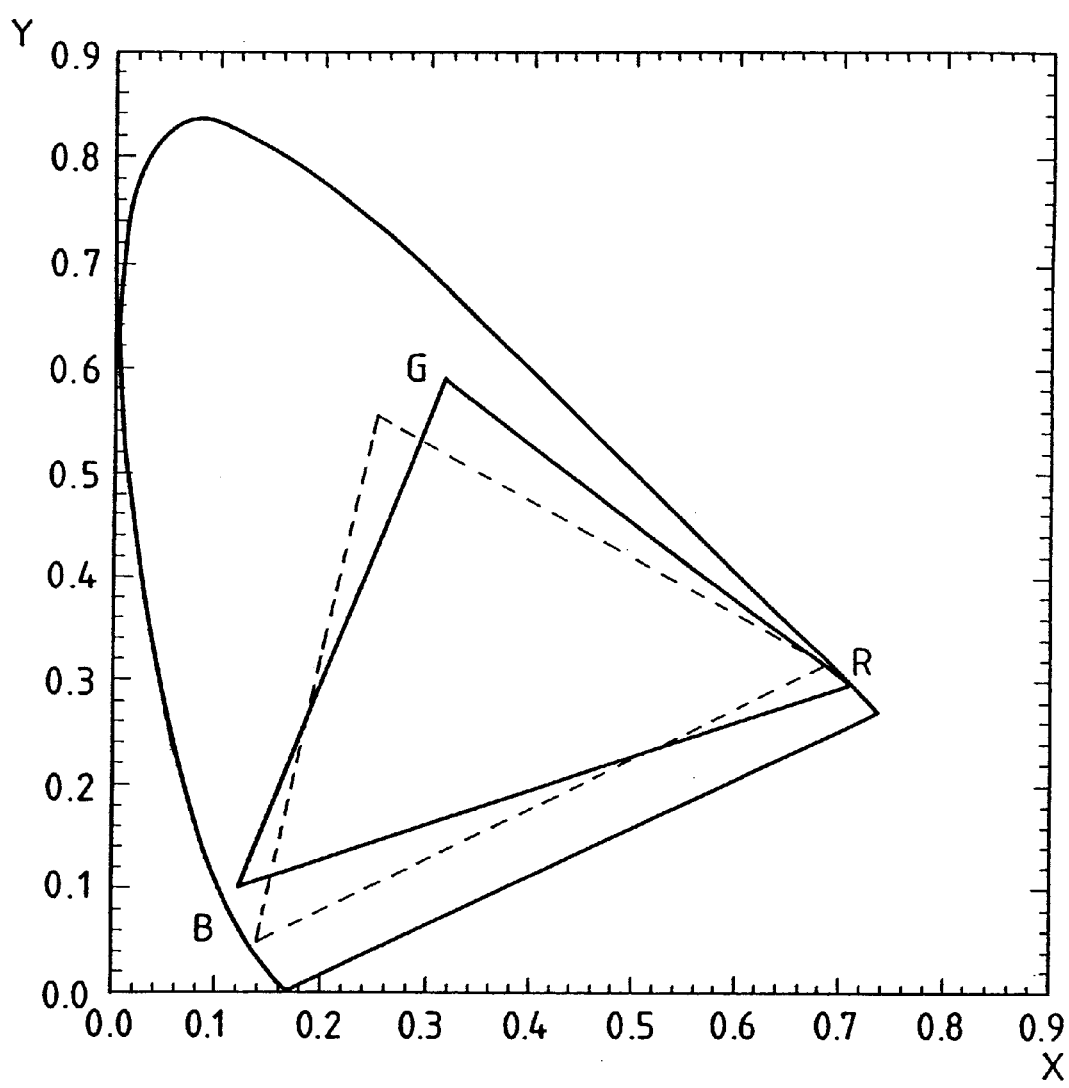
FIG. 24 is a graph showing shifts in the color space of the color image sensor owing to shifts in the spectral radiation characteristics of R, G, and B LED chips with rises in temperature in the third embodiment.
Figure 25:
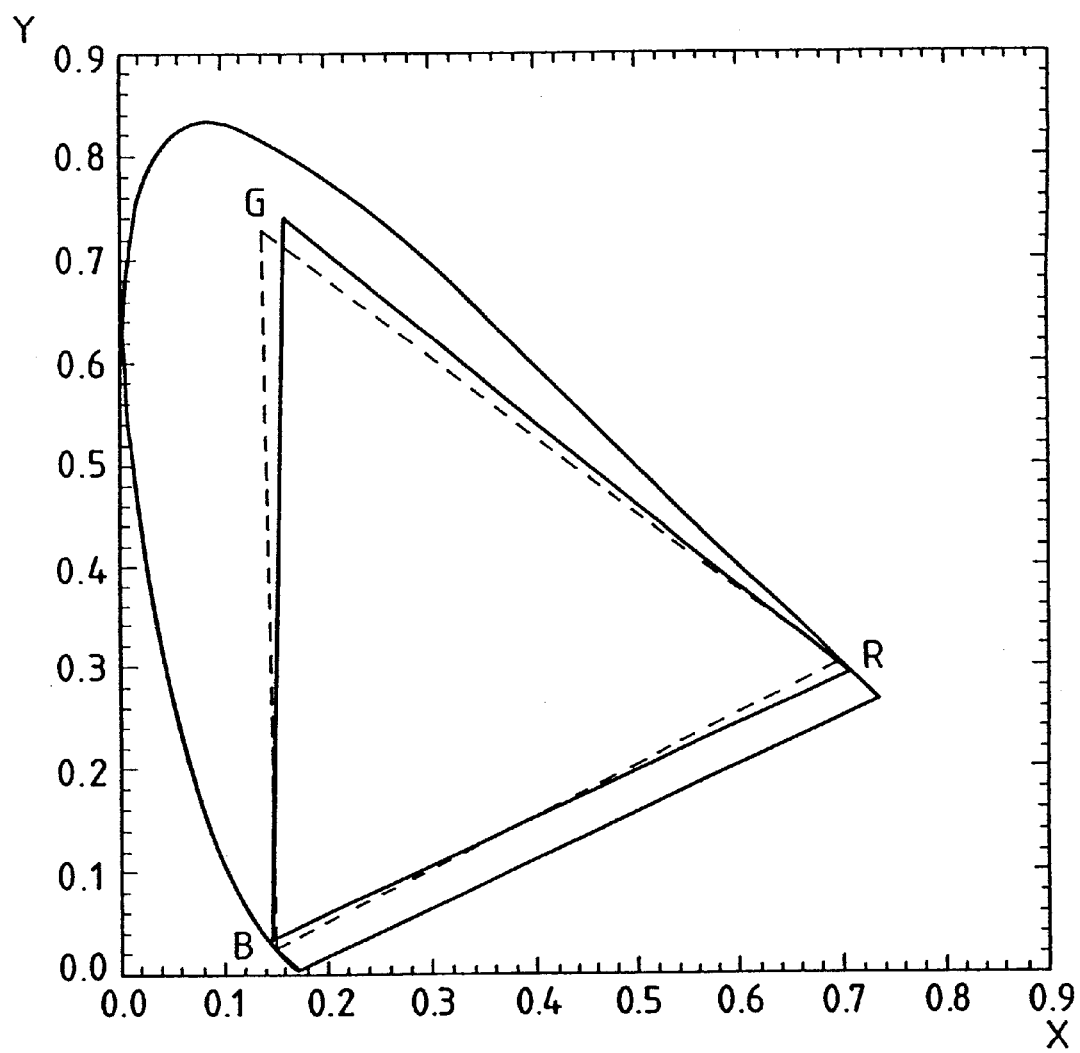
FIG. 25 is a graph showing shifts in the color space of the color image sensor owing to shifts in the spectral radiation characteristics of R, G, and B LED chips having color filters with rises in temperature in the third embodiment.

As is apparent from comparison between the characteristics shown in FIGS. 24 and 25, the incident surface 22 mounted on each LED chip is colored to have desired spectral transmission characteristics, changes in the color space of the color image sensor, which occur when the spectral radiation characteristics of each LED chip shift as the operating temperature changes, can be suppressed. Therefore, stable color original read operations can be performed regardless of whether the color image sensor is used in places where different operating temperatures are set or the operating temperature rises after the image sensor is continuously used for a long period of time.

According to the second and third embodiments, in the light source switching type color image sensor using the R, G, and B LEDs as light sources for irradiating an original, color filters of the same colors as those of light beams emitted from the R, G, and B LEDs are mounted on the transparent resins covering the R, G, and B LED chips, or color filters are formed by coloring transparent resins in the same colors as those of light beams emitted from the LEDs. With this structure, an original surface can be irradiated with light beams after the spectral radiation characteristics of the R, G, and B LED chips themselves are changed into characteristics suitable for the color image sensor. Therefore, a color image read operation can be performed with good color reproducibility at a low cost by using limited types of LED chips.

In addition, variations in the spectral transmission characteristics of color filters and transparent resins can be suppressed as compared with production variations in the spectral radiation characteristics of LED chips. Even if one light source is constituted by many LED chips arranged in an array, variations in spectral characteristics of light irradiated on an original surface can be reduced, thus realizing an original read operation with little color irregularity. Furthermore, since the amount of change in the spectral transmission characteristics of each color filter or transparent resin is small as compared with the amount of change in the spectral radiation characteristics of each LED chip with changes in operating temperature, even if the operating temperature rises when, for example, an original read operation is performed for a long period of time, a stable color signal can be obtained. Moreover, if the color LED chips in the second and third embodiments are used in the arrangement of the first embodiment, the size of the image sensor can be reduced while the color reproducibility is improved.

FIG. 34 shows an information processing apparatus using the contact image sensor in each embodiment described above, in which an image reading apparatus 110 incorporating a contact image sensor 100 is connected to a personal computer 130 to form a system, and read image information is sent to the computer or a network. Referring to FIG. 34, a CPU 112 serves as a first control means for controlling the overall image reading apparatus 110. The color image sensor is constituted by the components described above such as the light sources and the CCD line sensor, and serves as a read unit for converting an original image into an image signal. An analog signal processing circuit 116 performs analog processing such as gain adjustment for an analog image signal output from the color image scanner 100.

An A/D converter 118 converts the output from the analog signal processing circuit 116 into a digital signal. A digital image processing circuit 120 performs Image processing such as shading correction processing, gamma conversion processing, and magnifying processing for the output data from the A/D converter 118 by using a memory 122. An interface 124 outputs the digital image data having undergone image processing in the digital image processing circuit 120 to an external unit. The interface 124 complies with the interface standards employed by personal computers, such as the SCSI or Bi-Centronics standards, and is connected to the personal computer 130. The analog signal processing circuit 116, the A/D converter 118, the digital image processing circuit 120, and the memory 122 constitute a signal processing means.

The personal computer 130 serving as a second control means is equipped with a magnetooptical disk drive, a floppy disk drive, or the like as an external storage or auxiliary storage 132. A display 134 displays an operation on the personal computer 130. A mouse/keyboard 133 is used to input commands and the like to the personal computer 130. An interface 135 serves to exchange data, commands, the status information on the image reading apparatus between the personal computer and the image reading apparatus.

The personal computer 130 allows the user to input a read instruction to the image reading apparatus through the mouse/keyboard 133. Upon reception of a read instruction from the mouse/keyboard 133, a CPU 136 transmits a read command to the image reading apparatus through the interface 135. The CPU 136 in the personal computer 130 controls the CPU 112 in the image reading apparatus in accordance with the control program information stored in a ROM 137. In addition, the CPU 112 controls the light source and driving of the CCD line sensor and controls the signal processing means. Note that this control program may be stored in a storage medium such as a magnetooptical disk or a floppy disk loaded into the auxiliary storage 132, and the CPU 136 may execute the program upon loading of the program into the personal computer 130.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:

a contact-type image sensor unit, which converts an image of an original into an image signal, said contact-type image sensor unit including a plurality of light sources, a light guide for guiding light irradiated from said light sources in a longitudinal direction to emit the light from a side of said light guide parallel with the longitudinal direction so as to irradiate the original with the light, wherein said light sources are positioned at the end portion of said light guide and the light irradiated from said light source is bent at a substantial right angle by said light guide, and a light-receiving sensor which is arranged on a common sensor board with said light sources, for receiving light reflected by the original and outputting the image signal;

an analog signal processing circuit, which subjects an analog image signal output from said contact-type image sensor unit, to a predetermined processing which includes at least a gain adjustment processing;

an A/D converter, which converts an output of said analog signal processing circuit into a digital signal;

a control unit, which controls said light sources, said light-receiving sensor, said analog signal processing circuit, and said A/D converter; and an interface, which outputs the digital signal to an external apparatus and inputting a signal from the external apparatus.

2. An apparatus according to claim 1, wherein at least one end portion of said light guide is bent at a substantial right angle.

3. An apparatus according to claim 2, wherein two end portions of the light guide are bent at a substantial right angle respectively and said plurality of light sources are provided at each of said two end portions.

4. An apparatus according to claim 1, wherein said light guide includes a diffusion and/or reflection portion for diffusing and/or reflecting the light irradiated from said light sources.

5. An apparatus according to claim 1, wherein said plurality of light sources irradiate lights of different wavelengths respectively.

6. An apparatus according to claim 1, wherein said plurality of light sources comprises LEDs.

7. An apparatus according to claim 6, wherein said plurality of light sources irradiate light of different wavelengths respectively.

8. An apparatus according to claim 1, wherein said plurality of light sources and said light-receiving sensor are arranged on a common substrate.

9. An apparatus according to claim 8, wherein said plurality of light sources irradiate light of different wavelengths respectively.

10. An apparatus according to claim 9, wherein said plurality of light sources comprises LEDs.

11. An apparatus according to claim 1, wherein said interface conforms to a standard for establishing a connection with an external computer.

12. An apparatus according to claim 11, wherein said control unit operates according to an instruction provided from said external computer connected through said interface.

13. An apparatus according to claim 11, wherein said plurality of light sources irradiate light of different wavelengths respectively.

14. An apparatus according to claim 13, wherein said plurality of light sources comprises LEDs.

15. An apparatus according to claim 1, further comprising a digital image processing circuit which subjects an output of said A/D converter to an image processing including shading correction processing, a gamma conversion processing and a magnification processing.

16. An apparatus according to claim 15, wherein said plurality of light sources irradiate light of different wavelengths respectively.

17. An apparatus according to claim 16, wherein said plurality of light sources comprises LEDs.

* * * * *

UNITED STATES PATENT AND TRADEMARK OFFICE
CERTIFICATE OF CORRECTION

PATENT NO.     : 6,417,508 B1
DATED          : July 9, 2002
INVENTOR(S)    : Makoto Ogura et al.

It is certified that error appears in the above-identified patent and that said Letters Patent is hereby corrected as shown below:

Title page,
Item [57], ABSTRACT,
Line 2, "with" should read -- to --.

Column 2,
Line 5, "form" should read -- from --.

Column 3,
Line 48, "has" should read -- has been --.

Column 7,
Line 24, "n" should read -- on --.

Signed and Sealed this

Twenty-fifth Day of February, 2003

JAMES E. ROGAN
*Director of the United States Patent and Trademark Office*